(12) United States Patent
Flowers et al.

(10) Patent No.: US 7,451,848 B2
(45) Date of Patent: Nov. 18, 2008

(54) FOLDABLE PERSONAL MOBILITY VEHICLE

(76) Inventors: Michael J. Flowers, 2 Shannon La., Mantua, NJ (US) 08051; George G. Flowers, 517 Fordham Rd., Woodbury Heights, NJ (US) 08097; Stephen Jarema, III, 86 Pine Ave., Pittsgrove, NJ (US) 08318; Edward J. Dwyer, Jr., 427 Upperneck Rd., Pittsgrove, NJ (US) 08318; Lee Volpe, 14A Holly Cove, Mt. Laurel, NJ (US) 08054; Alex He, 701 W. Red Bank Ave. Apt. N4, Woodbury, NJ (US) 08096; Robert C. Hopely, Jr., 409 Second St., Sewell, NJ (US) 08085

( * ) Notice: Subject to any disclaimer, the term of this patent is extended or adjusted under 35 U.S.C. 154(b) by 0 days.

(21) Appl. No.: 10/277,664

(22) Filed: Oct. 23, 2002
(Under 37 CFR 1.47)

(65) Prior Publication Data
US 2003/0141121 A1    Jul. 31, 2003

Related U.S. Application Data

(60) Provisional application No. 60/347,029, filed on Jan. 4, 2002, provisional application No. 60/342,921, filed on Oct. 26, 2001.

(51) Int. Cl.
*B62D 61/00* (2006.01)
(52) U.S. Cl. ............... 180/208; 180/907; 280/278; 280/287

(58) Field of Classification Search ........... 180/208, 180/907; 280/278, 287
See application file for complete search history.

(56) References Cited

U.S. PATENT DOCUMENTS

| 3,004,619 | A | | 10/1961 | Straussler |
| 3,213,957 | A | | 10/1965 | Wrigley |
| 3,369,629 | A | | 2/1968 | Weiss |
| 3,580,348 | A | | 5/1971 | Di Blasi |
| 3,710,965 | A | * | 1/1973 | Joosten |
| 4,026,573 | A | | 5/1977 | Richardson |
| 4,087,108 | A | * | 5/1978 | Winchell ............ 280/278 |
| 4,432,561 | A | * | 2/1984 | Feikema et al. ......... 280/282 |
| 4,570,739 | A | | 2/1986 | Kramer |
| 4,573,549 | A | | 3/1986 | Pankow |
| 4,750,578 | A | | 6/1988 | Brandenfels |
| 4,825,971 | A | | 5/1989 | Bernstein |

(Continued)

FOREIGN PATENT DOCUMENTS

EP    362033    *    4/1990    ............ 280/278

(Continued)

*Primary Examiner*—Eric Culbreth
(74) *Attorney, Agent, or Firm*—Frijouf, Rust & Pyle, P.A.

(57) ABSTRACT

A foldable personal mobility vehicle is disclosed comprising first and second units having first and second wheels being rotatable about first and second axles. A drive unit rotates the second wheel for moving the foldable personal mobility vehicle. A pivot disposed substantially parallel to the first and second axles pivotably connects the first unit to the second unit for folding the personal mobility vehicle. The foldable personal mobility vehicle may include a folding unit for automatically folding the foldable personal mobility vehicle.

33 Claims, 16 Drawing Sheets

U.S. PATENT DOCUMENTS

| | | |
|---|---|---|
| 4,909,525 A | 3/1990 | Flowers |
| 4,947,955 A | 8/1990 | Hopely, Jr. |
| 5,020,624 A | 6/1991 | Nesterick et al. |
| 5,036,938 A | 8/1991 | Blount et al. |
| 5,150,762 A | 9/1992 | Stegeman et al. |
| 5,183,129 A * | 2/1993 | Powell ................ 180/208 |
| 5,238,082 A | 8/1993 | Stegeman et al. |
| 5,265,695 A | 11/1993 | Piazzi |
| 5,277,267 A | 1/1994 | Tiffany |
| 5,312,126 A | 5/1994 | Shortt et al. |
| 5,695,021 A | 12/1997 | Schaffner et al. |
| 5,979,921 A | 11/1999 | Derven et al. |
| 6,176,337 B1 | 1/2001 | McConnell et al. |
| 6,183,002 B1 | 2/2001 | Choi et al. |
| 6,186,252 B1 | 2/2001 | Schaffner et al. |

FOREIGN PATENT DOCUMENTS

| | | | | |
|---|---|---|---|---|
| EP | 505598 | * | 9/1992 | ................ 280/278 |
| GB | 1250876 | * | 10/1971 | ................ 280/287 |
| JP | 59-73373 | * | 4/1984 | ................ 180/208 |

* cited by examiner

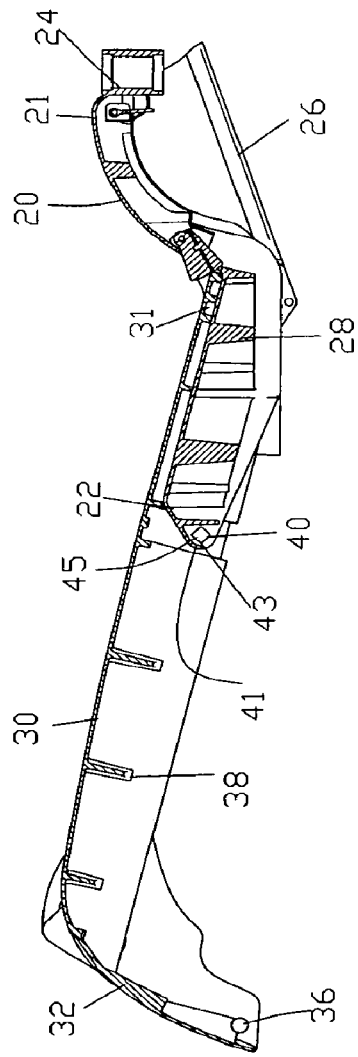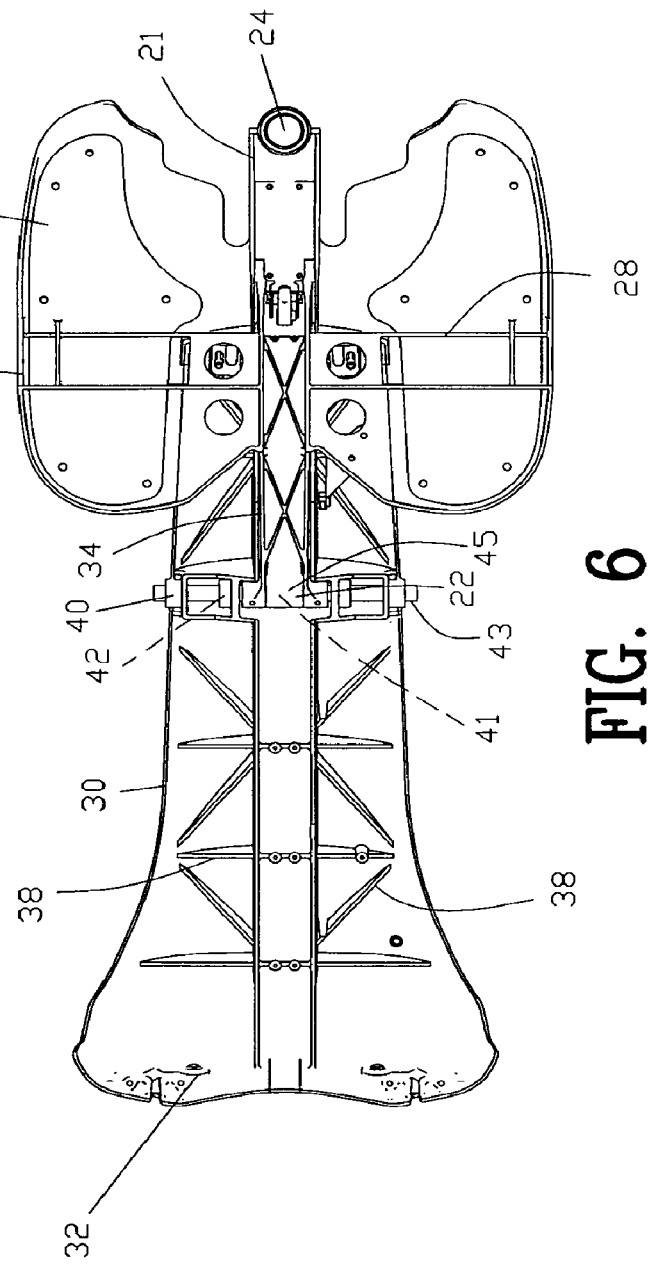

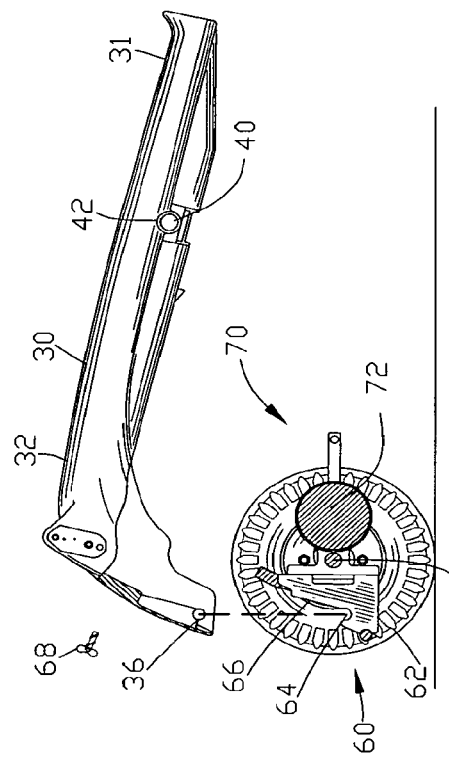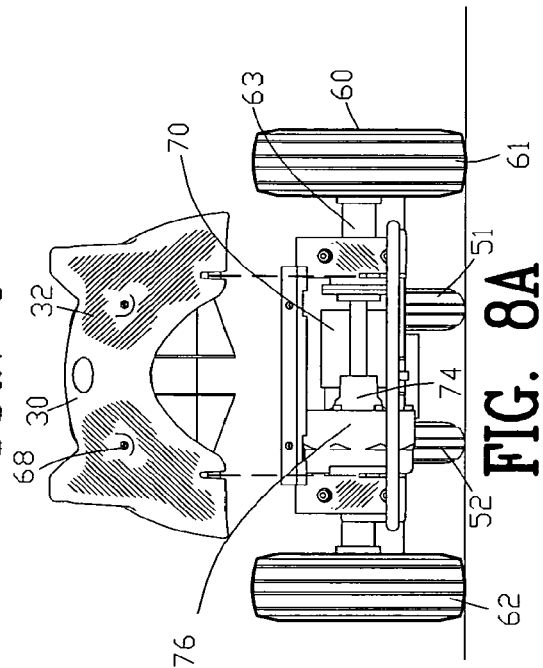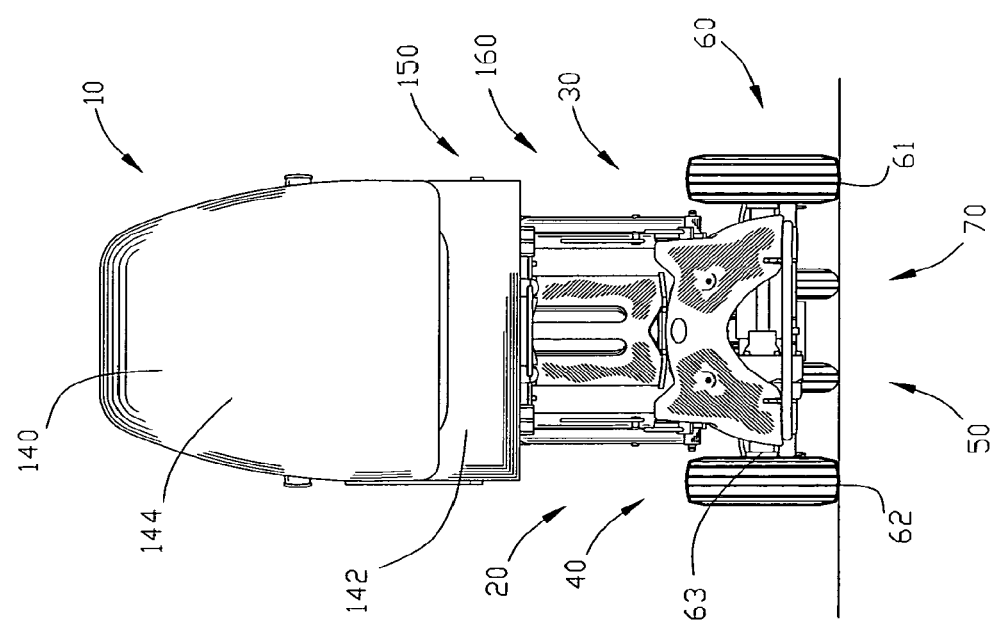

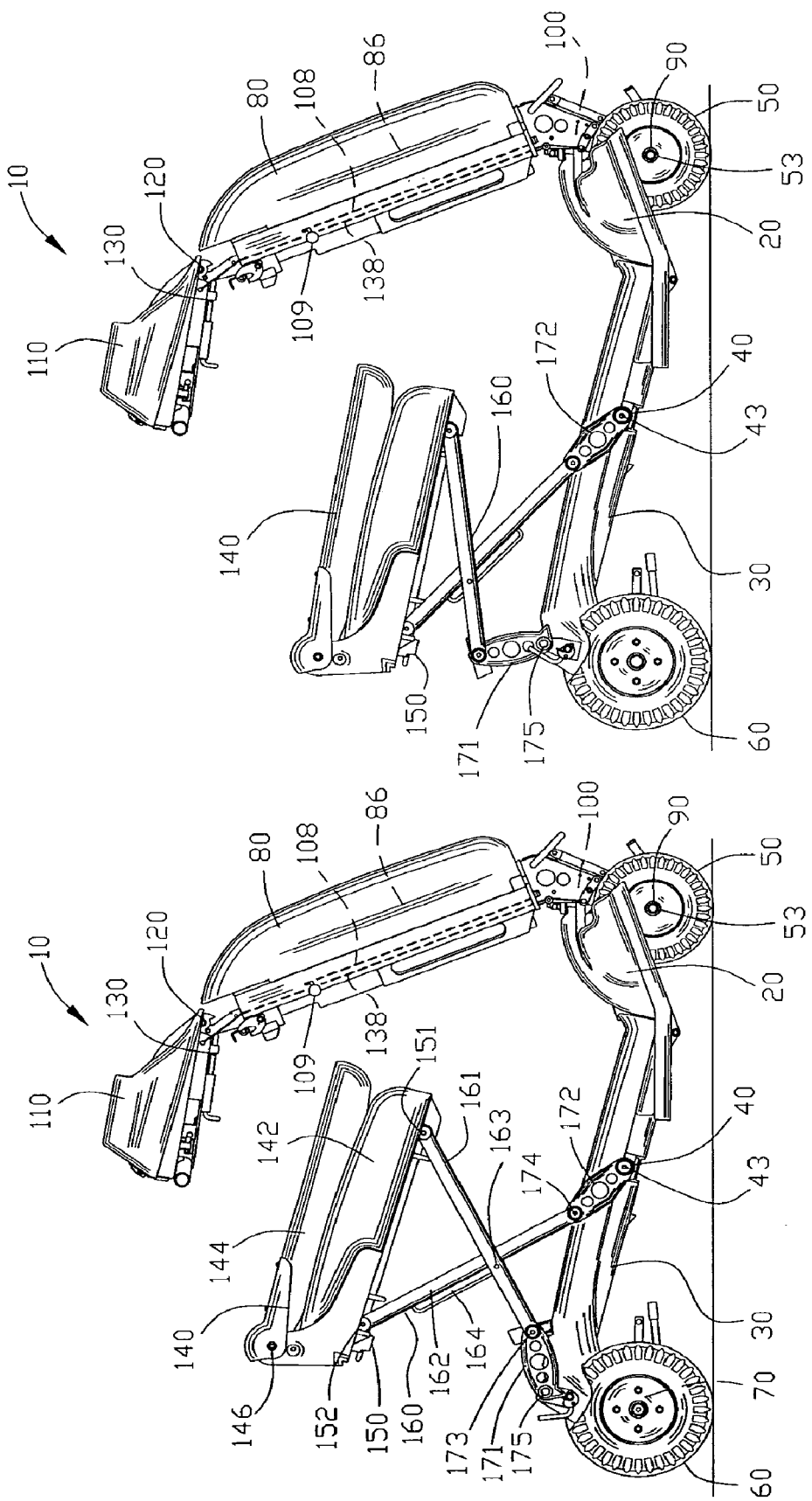

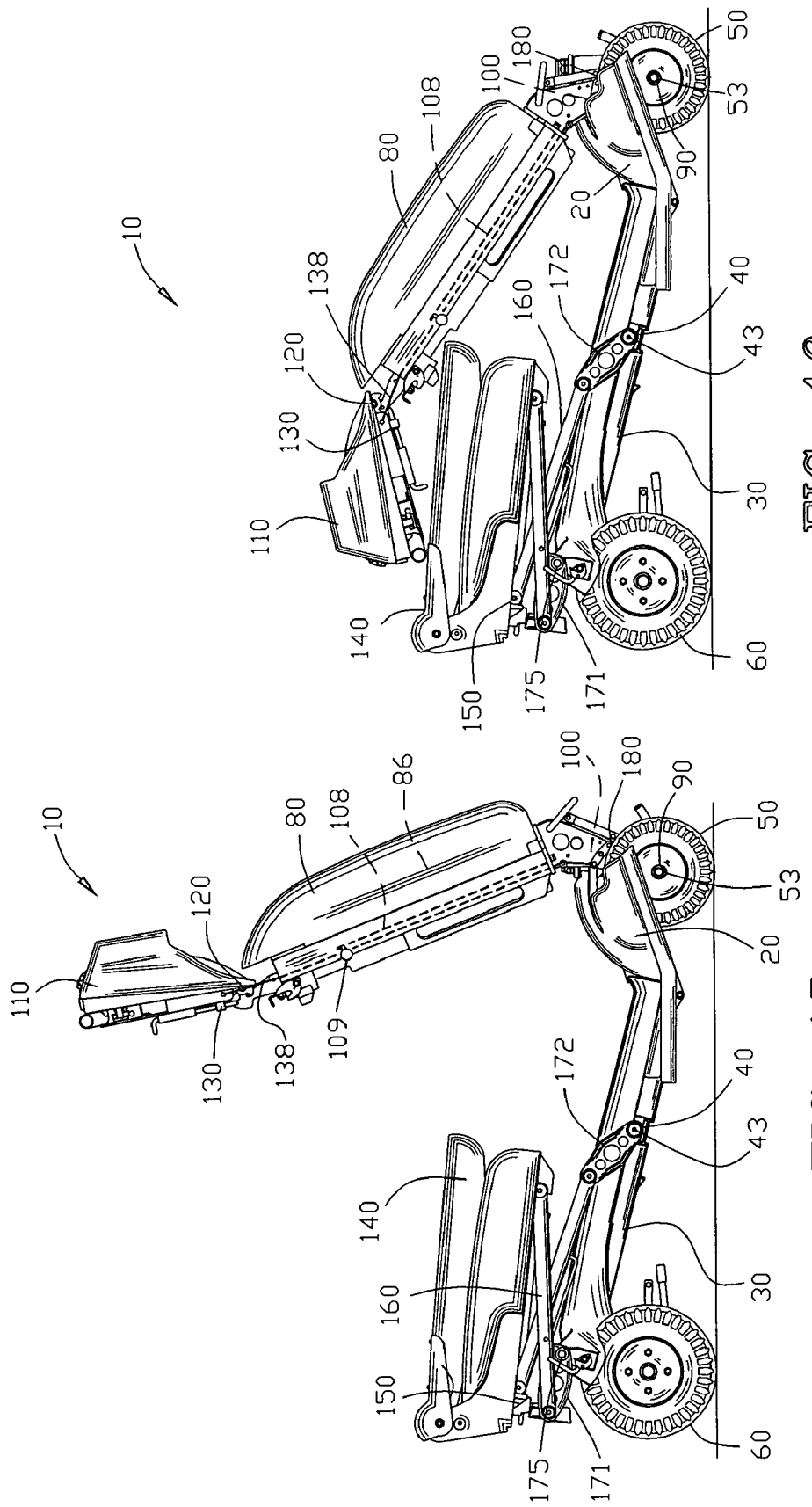

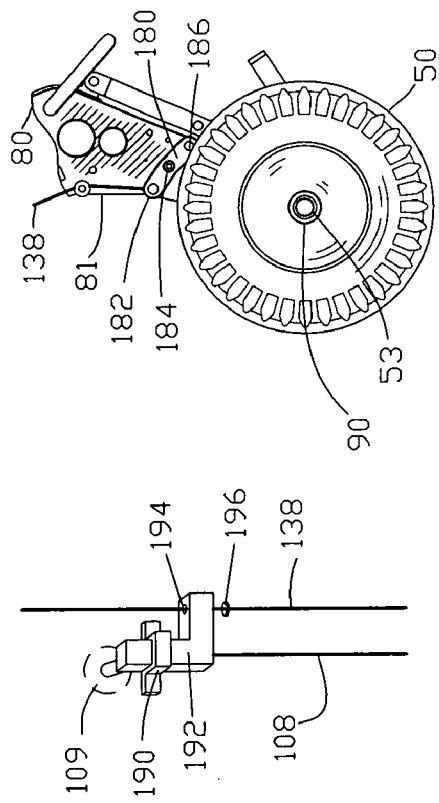
FIG. 17A
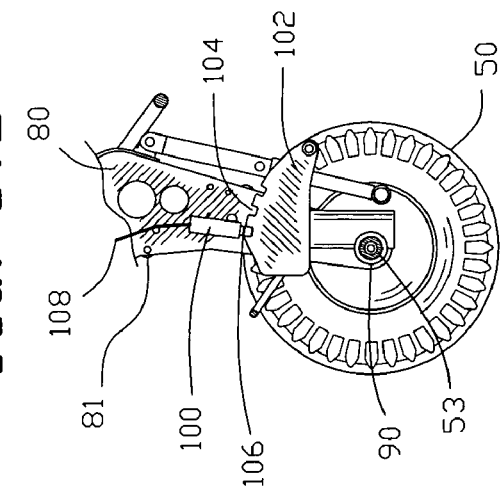
FIG. 17B
FIG. 17C
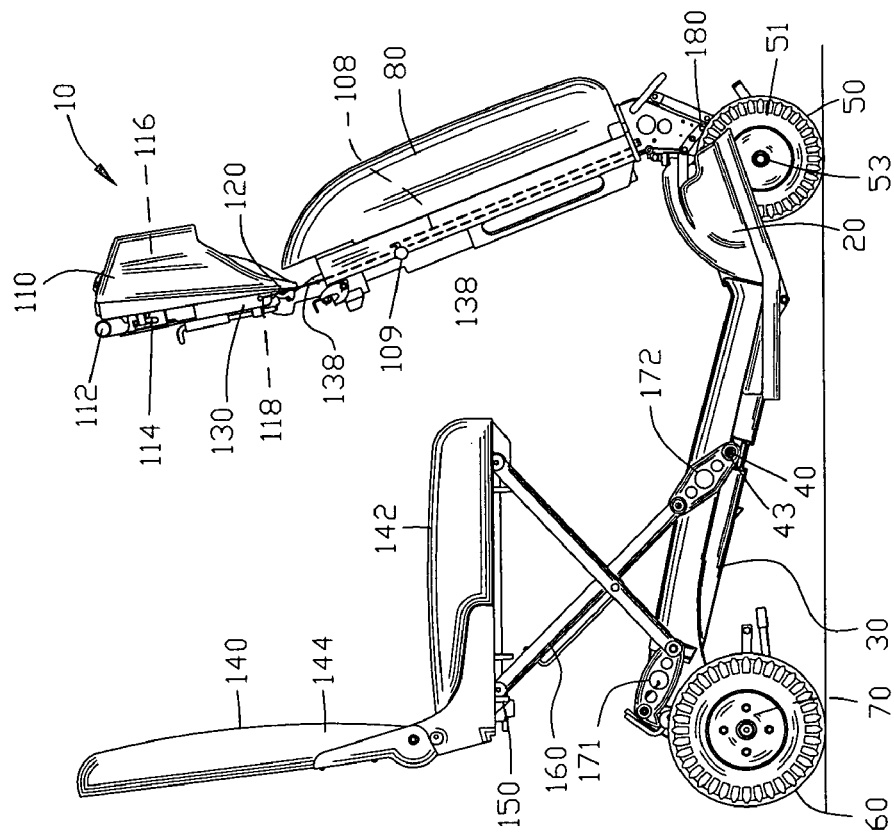
FIG. 17

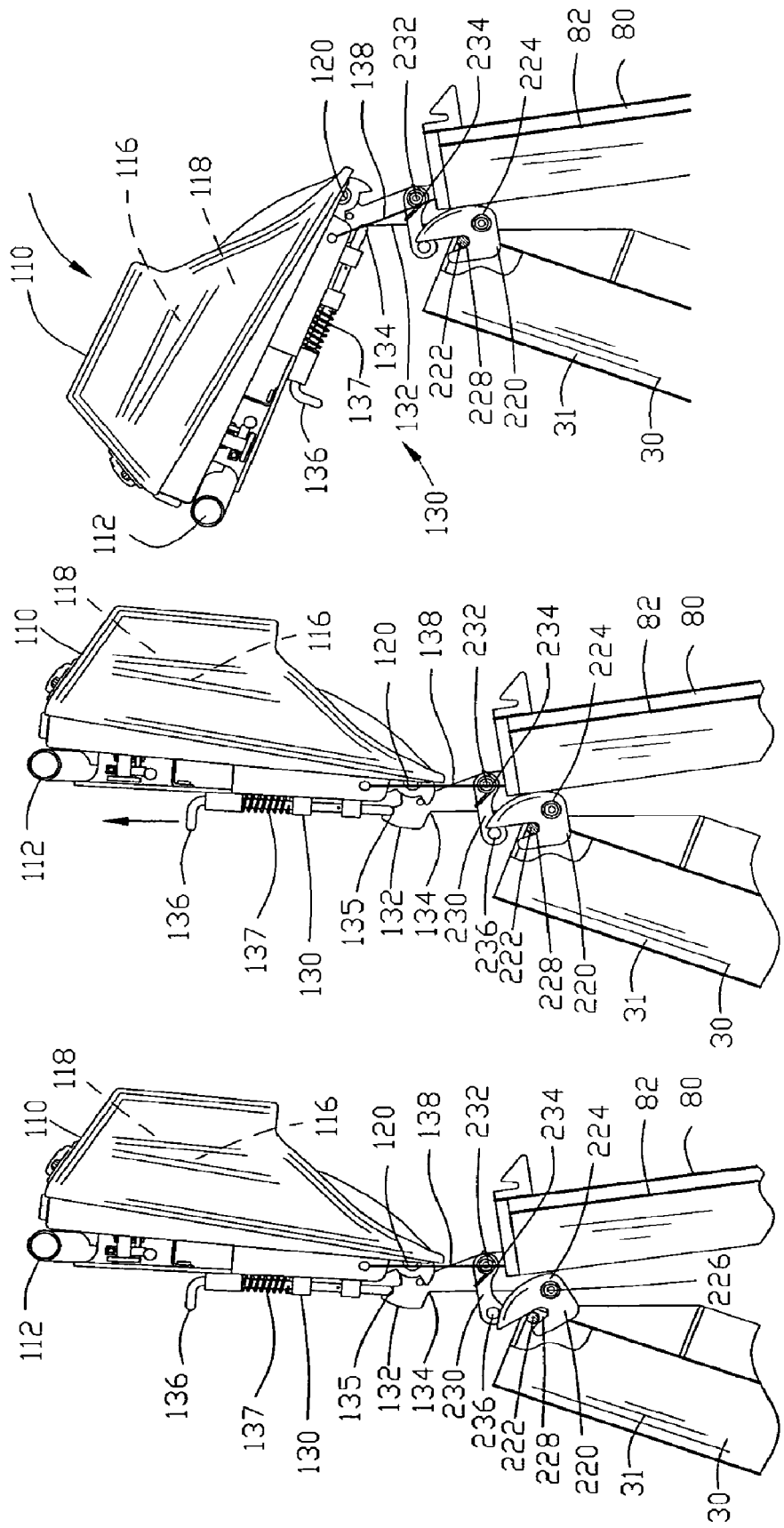

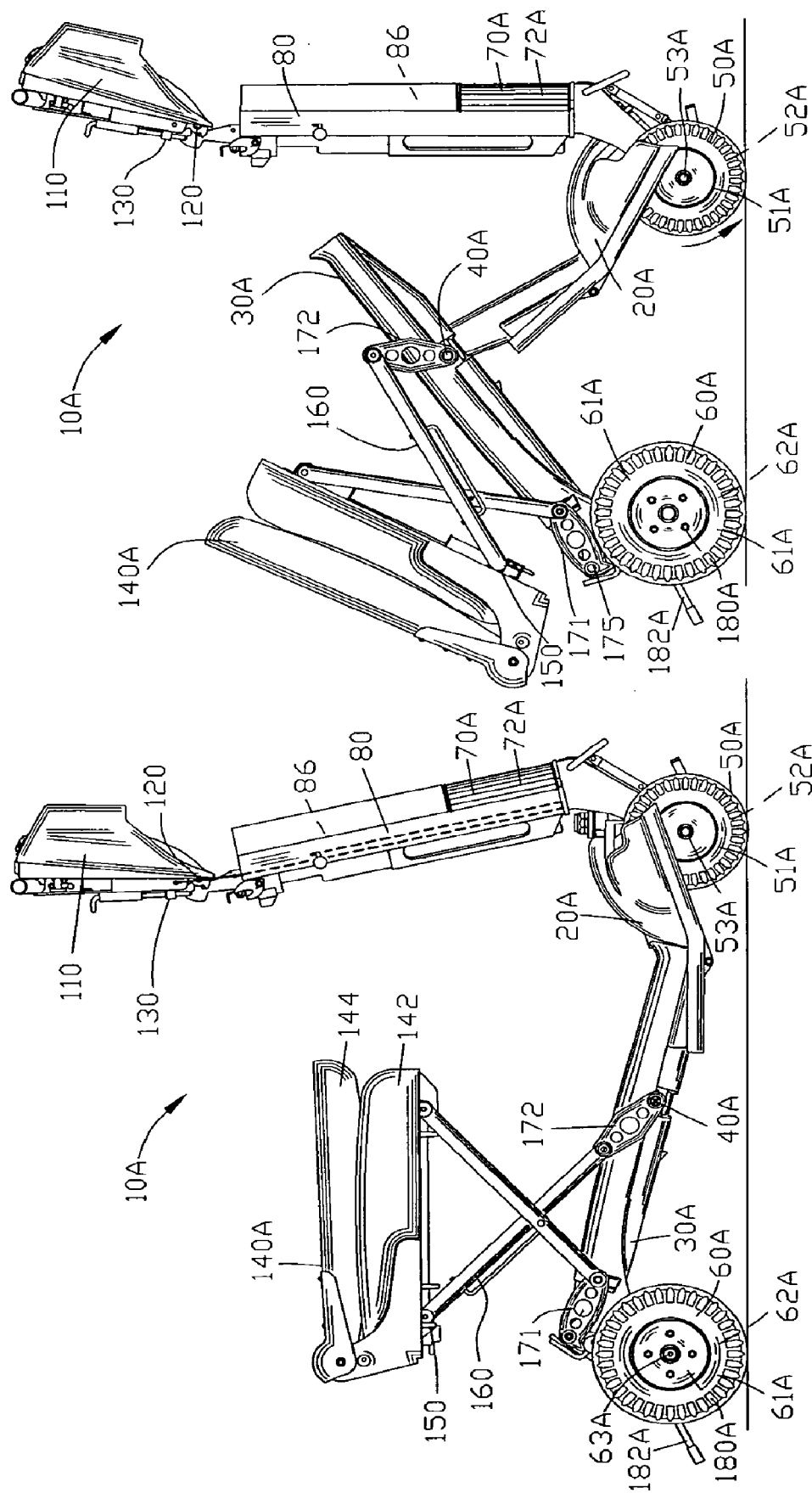

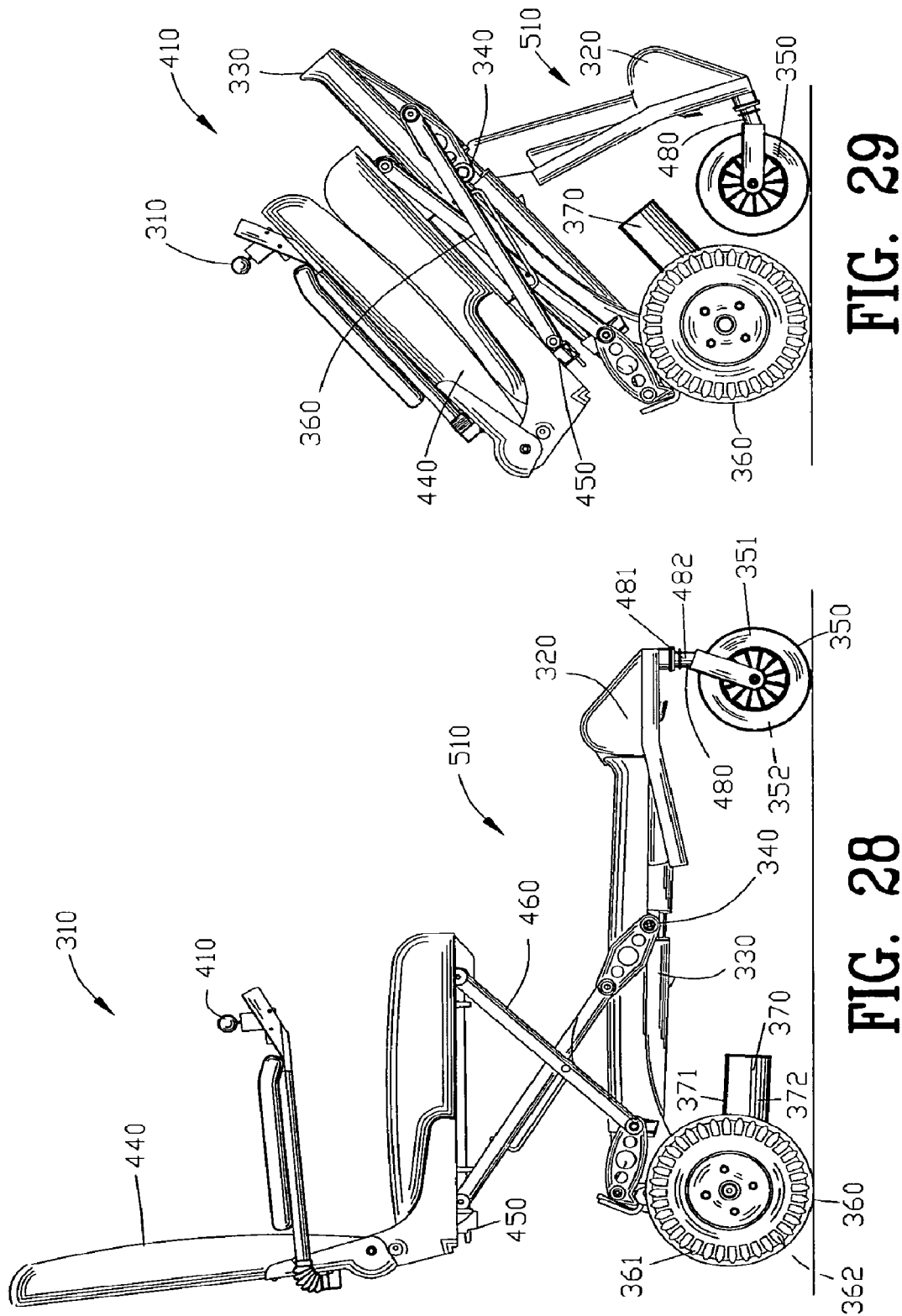

FOLDABLE PERSONAL MOBILITY VEHICLE

CROSS-REFERENCE TO RELATED APPLICATIONS

This application claims benefit of U.S. Patent Provisional application Ser. No. 60/342,921 filed Oct. 26, 2001 and U.S. Patent Provisional application Ser. No. 60/347,029 filed Jan. 4, 2002. All subject matter set forth in provisional application Ser. No. 60/342,921 and provisional application Ser. No. 60/347,029 are hereby incorporated by reference into the present application as if fully set forth herein.

BACKGROUND OF THE INVENTION

1. Field of the Invention

This invention relates to personal mobility vehicles and more particularly to an improved personal mobility vehicle having a folding unit to fold the personal mobility vehicle for transportation and storage.

2. Description of the Related Art

The popularity of personal mobility vehicles has dramatically increased over the last several decades. This increase in the popularity of personal mobility vehicles is due to many factors including the advent of new structural material as well as new manufacturing techniques.

Although personal mobility vehicles of the prior art provide the desired mobility to the user, the personal mobility vehicles of the prior art suffered from certain disadvantages. Firstly, the personal mobility vehicles of the prior art were difficult to store during nonuse of the personal mobility vehicle. In general, the size of the personal mobility vehicles of the prior art prohibited the storage of the personal mobility vehicle within a closet or a small room.

Secondly, the personal mobility vehicles of the prior art were difficult to transport in a conventional automobile. In order to transport a personal mobility vehicle of the prior art in a conventional automobile, the personal mobility vehicle had to be dissembled prior to being placed into the luggage compartment of the conventional automobile.

Thirdly, the personal mobility vehicles of the prior art were difficult to lift in an assembled condition. The personal mobility vehicles of the prior art could be transported in a small truck, small van or a sports utility vehicle in an assembled form. Unfortunately, because of the overall size of the assembled personal mobility vehicles of the prior art, a lift, hoist or two individuals were required in order to lift the personal mobility vehicle from the ground to the luggage compartment of the small truck, small van or the sports utility vehicle.

Some in the prior art have attempted to solve the problems of the transportation and storage of a personal mobility vehicle by collapsing or folding the personal mobility vehicle. The following U.S. patents represent several attempts of the prior art to provide a collapsible or foldable personal mobility vehicle.

U.S. Pat. No. 3,004,619 to Straussler discloses a collapsible motor vehicle comprising a chassis having cross members and side members. One of the cross members carries drive wheels and the other cross member carries a steering wheel. A steering column couples a coupling connection from the steering column to the steering wheel. A seat is arranged on the side members. A motor in the chassis is connected to the drive wheels. Each of the side members has a movable section connecting the cross members. Guide means mounts on the side members to enable the movable sections to slide one with respect to the other. Coupling means is mounted on one of the movable sections to enable one of the cross members and one of the movable sections of each of the side members to slide one with respect to the other. Locking means rigidly fixes the movable sections of each side member in a running position of the vehicle, whereupon disengaging the locking means enables the vehicle to be arranged in a collapsed condition with the steering wheel touching the cross member of the drive wheels.

U.S. Pat. No. 3,213,957 to Wrigley discloses a self-propelled wheel chair comprising a seat supporting frame, a pair of rear wheels and a housing rigidly secured to the seat support frame. A front wheel in the housing is rotatably mounted to permit steering movement thereof. A drive motor is located in the housing for effecting rotation of the wheel on a horizontal axis to drive the wheel chair. Armrests are rigidly secured to the backrest supporting frame. A pivot connection is located between the back rest supporting frame and the seat supporting frame permitting hinging of the back rest supporting frame forwardly with respect to the seat rest supporting frame from a vertical position into a position in which the back rest supporting frame lies parallel with the seat supporting frame when not in use, a vertically positioned steering column extending into the housing and adapted to be releasably connected at its lower end to the front wheel and having a handle bar at its upper end. The steering column is positioned in front of the seat and centrally located with respect thereto and is removable for access to the chair. A battery support frame is positioned beneath the seat support frame with switch means controlling the electric motor. Means electrically connect the battery through the switch means to the electric motor. The steering column has a control rod extending centrally there through with the lower end of the control rod adapted releasably to engage the switch means to actuate the latter. A control lever is pivotally mounted to the column adjacent the handle bar and is operably connected to the control rod for actuation thereof. A latch mechanism is removably secured to the steering column in operable position.

U.S. Pat. No. 3,369,629 to Weiss discloses a self-propelled vehicle which has a seat and backrest independently foldable forwardly. A steering column is foldable rearwardly over the folded seat and backrest to achieve a small package for storage and transportation.

U.S. Pat. No. 3,580,348 to Di Blasi et al. discloses a collapsible frame for wheeled vehicles, comprising a main structure to which rear forks are pivoted and carry wheels, a front footboard carrying a steering wheel, and a seat. The forks, footboard and seat are clampable to an open position where the frame is at running conditions and are operable to assume a closed position where the forks and footboard enter the main structure on which the seat can be overturned, in this case the frame occupying a rather reduced volume or space.

U.S. Pat. No. 4,026,573 to Richardson discloses a portable foldable motor scooter with a substantially triangular chassis, each corner of which is pivotable and one leg of which is hinged to allow the chassis to be folded to a collapsed condition. A steering column is pivotally connected to the forward corner of the chassis and is detachable from the chassis. The driver's seat is supported on front and rear linkages, the front linkage including a triangular portion containing the leg hinge of the chassis. A single removable pin normally locks this hinge and maintains the front seat-supporting linkage rigid. Upon removal of the pin the chassis can be folded to its collapsed position and the seat can be swung downwardly toward the rear wheel and can be latched to the rear wheel fender, holding the chassis in its collapsed position. The steering column has a handle bar which can be swung inwardly and fastened so as not to protrude from the folded vehicle.

U.S. Pat. No. 4,570,739 to Kramer discloses a personal mobility vehicle including a floor pan with a rear drive unit at one end and a steerable front wheel at the other end. The drive unit is separable from the floor pan and includes spaced apart, differentially connected rear wheels, an electric motor, and belts and pulleys drivingly connecting the motor to a differential unit. The front wheel is steered by a tiller. A seat with a folding back is removably connected to the floor pan toward the pan rear end to concentrate the weight of the driver over the rear wheels to aid in traction. A brake is provided on the front wheel and is lockable for parking purposes. Each of the drive unit, seat unit, a battery, and a floor pan unit weighs less than thirty pounds such that the separated components can be easily lifted and manipulated for transportation of the vehicle between sites of use.

U.S. Pat. No. 4,573,549 to Pankow discloses a golf car apparatus including a frame supported off the surface of the ground by at least three wheels, two of the wheels being positioned near the back end of the frame and being interconnected by an axle. DC batteries interconnected to an electrical motor are utilized to power golf car apparatus. A drive mechanism is interconnected to the electrical motor and a differential mechanism positioned near the center of the axle interconnecting the two rear wheels. Foot support means is defined by the frame on either side of the differential mechanism and extend under the axle for positioning of a user's feet such that when the user is standing on the golf car apparatus the user's feet extend at least partially under the axle so as to provide the golf car apparatus with a low center of gravity and a center of gravity distributed between the front and rear wheels.

U.S. Pat. No. 4,750,578 to Brandenfels discloses a chassis member with rear wheels and a battery compartment having a detachable connection with an upright front wheel support. The front wheeled support has a steering handle assembly pivotally connected thereto which can be locked in upright position or swung rearwardly into a folded position parallel with the front wheeled support, or pivoted forwardly for use as a dolly-type handle. An electric motor is mounted on the front wheel support and has lead wires to the battery and to a switch operated by a belt tightener providing driving power when a hand lever is depressed but providing free wheeling when the lever is released. The lead wires for the battery are of a length and have disconnects which allow the battery to be carried on the person if desired. The cart is adapted to receive a removable seat and when knocked down consists of the chassis member, the front wheeled support, the battery, and the seat if the latter is used. The cart can be used to transport a person either in a sit down or stand up position, it has luggage carrying arms on the front wheeled support, it can be used as a dolly with or without power from the battery, and importantly, each of the dismantled parts are small and light enough for easy carrying by most persons and capable of being stored in overhead airplane or other vehicle storage areas.

U.S. Pat. No. 4,825,971 to Bernstein discloses a lightweight universal electric wheeled chair formed of hollow tubular frame members. The seat is preferably cantilevered from rear frame members. The frame includes two lower side frame members, each of which has relatively small wheels mounted at both ends. The frame also includes two rear frame members, pivotally connected together intermediate their ends to form an "X" configuration with the lower ends of each of the rear frame members being pivotally secured to the rear ends of the lower side frame members. The front of the two lower side members are coupled together using two frame members and linear bearings coupling the two frame members to permit adjustment and collapsing of the wheeled chair. Two upper side members extend forwardly from the rear of the wheeled chair, and are secured to the rear frame members. A seat may be supported directly on these two upper side frame members, or the two upper side frame members may serve as arms for the wheeled chair, with the seat being slung from these arms at a lower position. Motor and gearing arrangements are provided for varying the distance between the two side members to change the height of the seat. When the lower side members are at their maximum separation, the pivoted rear frame members are very nearly parallel and horizontal. Nickel-cadmium batteries may be mounted in the tubular frame of the wheeled chair, and each of the rear wheels is provided with a small electric motor, aligned with and coupled to each rear wheel through appropriate gear reduction assemblies.

U.S. Pat. No. 4,909,525 to Flowers discloses a personal mobility vehicle comprising front and rear frame section that can be disassembled and assembled. The frame sections are secured together by a pivotable detachable connection such that the rear frame section is locked to the rear portion of the front frame section and the length of the assembled frame is substantially the same as the length of the front frame section itself. An auxiliary frame section is also provided which can be readily attached to the powered rear frame section to provide improved mobility in those situations in which space for turning is limited.

U.S. Pat. No. 4,947,955 to Hopely discloses a personal mobility vehicle comprising front and rear frame section that can be disassembled and assembled. The frame sections are secured together by a pivotable detachable connection such that the rear frame section is locked to the rear portion of the front frame section and the length of the assembled frame is substantially the same as the length of the front frame section itself.

U.S. Pat. No. 5,020,624 to Nesterick et al. discloses a modular power drive scooter, including as modular components a seat, a seat post, a mainframe, a trailer and at least one battery and is built in a manner allowing quick and easy disassembly of the scooter for compact storage. In assembled form, the seat post supports the seat and also serves as a lock pin which prevents separation of the mainframe from the trailer. The mainframe includes a front wheel, a tiller assembly for steering the scooter, and recesses for accommodating one or more batteries. The trailer includes a pair of rear wheels coupled to a differential that is driven by an electric motor, and a removable storage tray that provides access to the motor. A stem member extending from the trailer engages the mainframe in an overlapping relation whereby apertures in the stem member align with ports in the mainframe. The seat post is inserted into a selected port to determine the spacing of the seat from the tiller assembly. Removal of the seat post from an aligned aperture and port enables the mainframe and the trailer to be separated by pulling a first handle located on the stem member to pivot the trailer relative to the mainframe, and then by lifting the mainframe by a second handle to disengage coupling hooks on the mainframe from a coupling rod of the trailer.

U.S. Pat. No. 5,036,938 to Blount et al. discloses a riding scooter that may be assembled and disassembled without the use of tools. The riding scooter is formed of components of a size and weight to be handled by a person of modest physical strength. The scooter's front and rear sections have overlapping engaging parts that are biased together in the operative position by the weight of the sections alone. Batteries for electrical power are contained within casings which are cooperatively retained within a battery housing and which also permit the batteries to be simultaneously electrically connected to the vehicle electrical system upon insertion of the battery casings within the battery housing. A steering tiller is detachably mounted to the front steering yoke being retained in an operative position by a quick release collar. Control for forward and reverse movement is accomplished through linkage which permits convenient manipulation of the control handle while providing maximum adjustment of an electric potentiometer which controls the electric motor; and, the seat assembly is designed to retain a selected adjustment from disassembly to assembly and further acts to reinforce the biased engagement of the front and rear sections of the scooter.

U.S. Pat. No. 5,150,762 to Stegeman et al. discloses a personal mobility vehicle including front and rear frames that are connected together in use. The rear frame supports the rear axle and drive wheels, as well as the electric motor/brake system. The front frame supports a front wheel spindle to which one or more front wheels are attached. A tiller is mounted to the front spindle, the tiller being collapsible for storage of the vehicle. A seat post is mounted to the front frame for supporting a removable seat, and a floor pan is mounted to the front frame to support the vehicular batteries, as well provide a foot rest for the rider. The front and rear frames are preferably connected together with a plate having a depending J-hook arranged to engage a plate having a depending lip. A latch and latch receiver serve to lock the connection together with the plates bearing against each other in compression to support the vehicle and rider. The tiller is positioned in a plurality of lock positions, including one collapsed position for compact storage.

U.S. Pat. No. 5,238,082 to Stegeman et al. discloses a personal mobility vehicle including front and rear frames that are connected together in use. The rear frame supports the rear axle and drive wheels, as well as the electric motor/brake system. The front frame supports a front wheel spindle to which one or more front wheels are attached. A tiller is mounted to the front spindle, the tiller being collapsible for storage of the vehicle. A seat post is mounted to the front frame for supporting a removable seat, and a floor pan is mounted to the front frame to support the vehicular batteries, as well provide a foot rest for the rider. The front and rear frames are preferably connected together with a plate having a depending J-hook arranged to engage a plate having a depending lip. A latch and latch receiver serve to lock the connection together with the plates bearing against each other in compression to support the vehicle and rider. The tiller is positioned in a plurality of lock positions, including one collapsed position for compact storage.

U.S. Pat. No. 5,265,695 to Piazzi discloses a portable collapsible golf cart vehicle adapted for use on a golf fairway and collapsible for storage and transport. A scooter-type vehicle having a steering mechanism and rear propelling mechanism in which the steering mechanism includes a steering column coupled with a steering handle for rotation of the steering column. A pivotal connection is provided for pivotally connecting and locking the steering mechanism in one position during propelling of the vehicle and in another position for storage of the vehicle. The mechanism includes a pivotal unit and a rear wheel with the pivotal unit being in a first position for use in a scooter vehicle and in a second position for storage in the compact condition.

U.S. Pat. No. 5,277,267 to Tiffany et al. discloses a collapsible, portable golf cart including a frame assembly and a wheel assembly operatively connected to the frame assembly for movement of the main frame assembly along a surface. The golf cart further includes a collapsible support assembly operatively connected to the main the frame assembly for selective movement between an erected position and a collapsed position relative to the frame assembly. A seating member for a cart rider is operatively connected to the collapsible support means for movement with the collapsible support means between the above mentioned positions.

U.S. Pat. No. 5,312,126 to Shortt et al. discloses a light, portable golf riding apparatus that may be electric motor or pedal driven. The lightness of the apparatus is provided in part by using a tubular construction, with few, if any, panels, and portability is provided by having the apparatus formed from several sections or frameworks pivoting in relation to each other. In one embodiment, a first central section holds the power train and rear wheels, a front section holds the steering column, and a third a seat for the rider. The central and front sections pivot towards each other, the seat folds onto the central section and the steering collapses about the apparatus to form a compact body.

U.S. Pat. No. 5,695,021 to Schaffner et al. discloses an electrically operated scooter vehicle for use by elderly, disabled and infirm people and including a self-locking connection means for connecting front and rear frame portions of the scooter. The scooter is convertible between three-wheel and four-wheel versions without use of tools. Automatic shut-off circuitry minimizes inadvertent loss of battery power due to failure to turn off the scooter. An adjustably lockable telescoping tiller facilitates use of the scooter by persons of all sizes.

U.S. Pat. No. 5,979,921 to Derven et al. discloses a folding bicycle trailer including a body portion having a passenger-receiving area, axle mounts, tongue mounts, and canopy mounts. The body portion is a unitary, one-piece structure, with the mounts being integrally formed therewith. An axle member is secured to the axle mount and carries wheel supports on each end thereof. The wheel supports are shiftable between an operable, extended position and a folded, storage position. A wheel is carried on each wheel support for free rotation relative thereto. An elongate tongue is carried on the tongue mount and extends forward from the body portion. A canopy frame, including fore and aft canopy members, is mounted on the body portion and is shiftable between a collapsible condition and a raised condition.

U.S. Pat. No. 6,176,337 B1 to McConnell et al. discloses a personal mobility vehicle having front and rear chassis members interconnected by a locking means. The rear chassis member includes alignment means for aligning the rear chassis with a suspension assembly of the front chassis. An adjustable seat assembly supports a user while preventing accidental disengagement of the locking means.

U.S. Pat. No. 6,183,002 B1 to Choi et al. discloses a wheelchair having a seat and a plurality of wheels for rolling the wheelchair along a ground surface. The seat includes a seat bottom and a seat back pivotally coupled to the seat bottom. The seat back is movable between a folded position and an unfolded position. The seat bottom has a back end formed from a first curved shape, and the seat back has a bottom end formed from a second curved shape. The first curved shape of the seat bottom is sized to mate with the second curved shape of the seat back when the seat back is in the unfolded position. A motor coupled to each rear wheel and a control stick is in communication with each motor for independently operating each of the motors to drive and steer the wheel chair.

U.S. Pat. No. 6,186,252 B1 to Schaffner et al. discloses a power chair comprising a frame transversely foldable between operating and transport positions. A seat is connected to the frame, with a pair of drive wheels also connected to the frame. The drive wheels are rotatable about a transverse axis below a portion of the seat supporting an occupant's thighs. The power chair further includes motors for driving respective drive wheels. Perspective motor/drive wheel combinations are pivotally connected to the frame. At least one ground-engaging idler wheel is connected to the frame, located rearward of the drive wheels. At least one anti-tip wheel is positioned above ground, forward of the drive wheels, and connected to the frame for movement relative to the frame upon encountering an obstacle.

Therefore, it is an object of the present invention to provide an improved foldable personal mobility vehicle capable of being folded for transportation and storage.

Another object of this invention is to provide an improved foldable personal mobility vehicle incorporating a tiller for functioning as a lever for manually folding the improved foldable personal mobility vehicle.

Another object of this invention is to provide an improved foldable personal mobility vehicle incorporating a drive unit for rotating the driving wheel for assisting in the folding of the front unit relative to the rear unit of the foldable personal mobility vehicle.

Another object of this invention is to provide an improved foldable personal mobility vehicle incorporating a chair support for collapsing a chair upon folding of the foldable personal mobility vehicle.

Another object of this invention is to provide an improved foldable personal mobility vehicle that may be moved easily on wheels when the improved foldable personal mobility vehicle is disposed in a folded condition.

Another object of this invention is to provide an improved foldable personal mobility vehicle that may be moved by incorporating a drive unit for rotating the driving wheel to move the improved foldable personal mobility vehicle in a folded condition.

Another object of this invention is to provide an improved foldable personal mobility vehicle that may be stored in an upright, self-standing folded condition.

Another object of this invention is to provide an improved foldable personal mobility vehicle that may be transported in the luggage compartment of a conventional automobile by folding the improved foldable personal mobility vehicle.

Another object of this invention is to provide an improved foldable personal mobility vehicle that may be folded without the need to dissemble the personal mobility vehicle.

Another object of this invention is to provide an improved foldable personal mobility vehicle that is light in weight to be easily lifted without the use of lifts and hoists.

Another object of this invention is to provide an improved foldable personal mobility vehicle that is light in weight to be easily lifted without the use of lifts and hoists into the luggage compartment of a conventional automobile.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention and the detailed description describing the preferred embodiment of the invention.

SUMMARY OF THE INVENTION

A specific embodiment of the present invention is shown in the attached drawings. For the purpose of summarizing the invention, the invention relates to a foldable personal mobility vehicle comprising a first unit including a first wheel being rotatable about a first axle. A second unit includes a second wheel being rotatable about a second axle. A pivot has a pivot axis substantially parallel to the first and second axles for pivotably connecting the first unit to the second unit. A pivot assist unit pivots the first unit relative to the second unit for folding the personal mobility vehicle about the pivot axis for folding the personal mobility vehicle about the pivot axis.

In a more specific embodiment of the invention, the foldable personal mobility vehicle may be a scooter, a wheel chair or a bicycle. The first and second units may be front and rear units of the foldable personal mobility vehicle. In the alternative, the first and second units may be rear and front units of the foldable personal mobility vehicle.

In one embodiment of the invention, the first wheel is pivotably mounted to the first unit for steering the foldable personal mobility vehicle. In an alternative embodiment of the invention, the second wheel comprises plural second wheels and the drive unit independently drives the plural second wheels for steering the foldable personal mobility vehicle.

The foldable personal mobility vehicle includes a drive unit for moving the foldable personal mobility vehicle. The drive unit may include a manual drive unit for enabling the operator to manually rotate the second wheel for moving the foldable personal mobility vehicle. In the alternative, the drive unit includes an electric motor for rotating either of the first or second wheels for moving the foldable personal mobility vehicle. Preferably, the drive unit may be removably secured to the second unit.

In one example, the pivot assist unit comprises an electrical motor for pivoting the first unit relative to the second unit. In another example, the pivot assist unit comprises a brake for braking the first wheel and the drive unit rotating the second wheel for assisting in the folding of the front unit relative to the rear unit of the foldable personal mobility vehicle. In the alternative, the pivot assist unit comprises a brake for braking the second wheel and the drive unit rotating the first wheel for assisting in the folding of the rear unit relative to the front unit of the foldable personal mobility vehicle. In still another example, the pivot assist unit comprises a lever arm for assisting in the folding of the front unit relative to the rear unit of the foldable personal mobility vehicle.

Preferably, the foldable personal mobility vehicle includes a collapsible chair mounted relative to one of the first and second units. The collapsible chair is mounted relative to one of the first and second units with a coupling interconnecting the pivot unit and the collapsible chair for collapsing the chair upon folding of the foldable personal mobility vehicle. Preferably, the collapsible chair is collapsible independent of the folding of the foldable personal mobility vehicle. The collapsible seat may include a backrest pivotably mounted to the seat for pivoting between an operating position and a folded position.

The foregoing has outlined some of the more pertinent objects of the present invention. These objects should be construed as being merely illustrative of some of the more prominent features and applications of the invention. Many other beneficial results can be obtained by modifying the invention with in the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

BRIEF DESCRIPTION OF THE DRAWINGS

For a fuller understanding of the nature and objects of the invention, reference should be made to the following detailed description taken in connection with the accompanying drawings in which:

FIG. 5 is a side view of a first and a second unit of the foldable personal mobility vehicle;

FIG. 6 is a bottom view of FIG. 5;

FIG. 7 is a rear view of FIG. 1;

FIG. 8 is an enlarged exploded side view of a portion of FIG. 7 illustrating a drive unit for the foldable personal mobility vehicle;

FIG. 8A is a rear view of FIG. 8;

FIG. 13 is a side view of the first embodiment of a foldable personal mobility vehicle of FIG. 1 illustrating an initial folding of the foldable personal mobility vehicle of FIG. 1;

FIG. 14 is a side view similar to FIG. 13 illustrating the further folding of the foldable personal mobility vehicle;

FIG. 15 is a side view similar to FIG. 14 illustrating the continued folding of the foldable personal mobility vehicle;

FIG. 16 is a side view similar to FIG. 15 illustrating the complete folding of the foldable personal mobility vehicle;

FIG. 17 is a side view of the foldable personal mobility vehicle of FIG. 1 illustrating the pivoting of a handlebar unit for actuating a brake for a first wheel and for disengaging the tiller pivot lock for enabling the pivoting of the tiller unit of the foldable personal mobility vehicle;

FIG. 17A is an enlarged view illustrating a cable interconnection for simultaneously actuating the brake and the tiller pivot lock;

FIG. 17B is an enlarged side view of a portion of FIG. 17 illustrating the brake in an actuated condition;

FIG. 17C is a view similar to FIG. 17 illustrating the disengagement of the tiller pivot lock for enabling the pivoting of the tiller unit of the foldable personal mobility vehicle;

FIG. 23 is an enlarged view of a portion of FIG. 22 illustrating the initial latching of the second unit to the first unit;

FIG. 24 is a view similar to FIG. 23 illustrating the final latching of the second unit to the first unit;

FIG. 25 is a view similar to FIG. 24 illustrating the engagement of the handlebar pivot lock;

FIG. 26 is a view similar to FIG. 18 illustrating an alternate embodiment of the personal mobility vehicle of the present invention;

FIG. 27 is a view similar to FIG. 26 illustrating the alternate embodiment of the personal mobility vehicle in a partially folded position in a manner similar to FIG. 20;

FIG. 28 is a side view of a second embodiment of a foldable personal mobility vehicle incorporating the present invention;

FIG. 29 is a side view similar to FIG. 28 illustrating the complete folding of the foldable personal mobility vehicle shown in FIG. 28;

Similar reference characters refer to similar parts throughout the several Figures of the drawings.

DETAILED DISCUSSION

Figure 2:
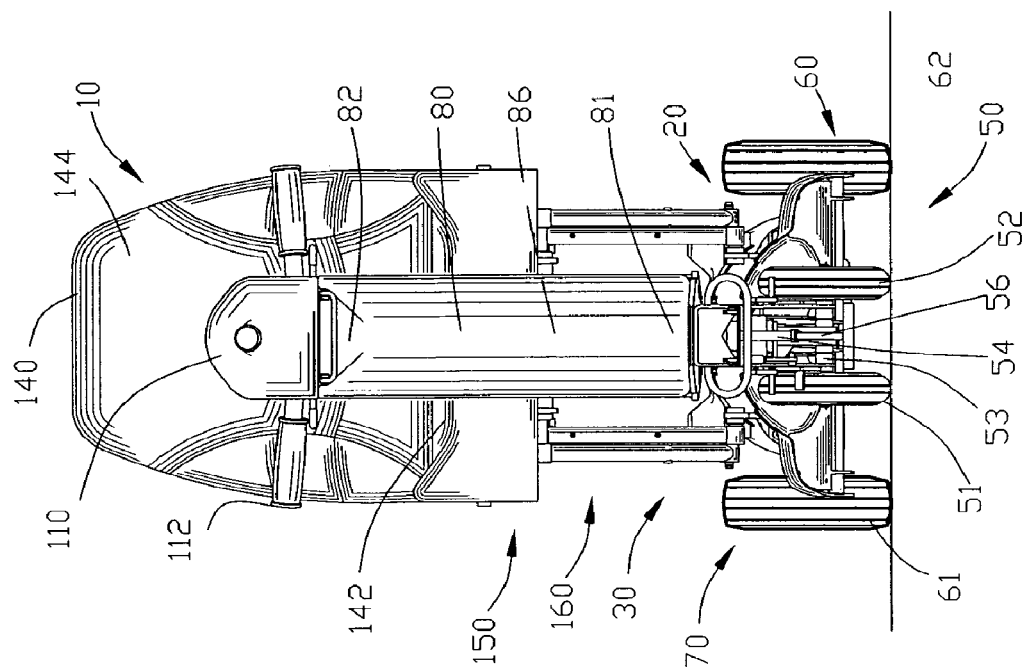
FIG. 2 is a front view of FIG. 1.

FIGS. 1-4 illustrate various views of a foldable personal mobility vehicle 10 for transporting an operator. The foldable personal mobility vehicle may be a manual or an electric scooter, a manual or an electric wheel chair or a manual or an electric bicycle or any other suitable manual or electric vehicle.

The foldable personal mobility vehicle 10 comprises a first unit 20 and a second unit 30. The first unit 20 extends between a first and a second end 21 and 22. In a similar manner, the second unit 30 extends between a first and a second end 31 and 32. In this example, the first and second units 20 and 30 are shown as front and rear units of the foldable personal mobility vehicle 10 but it should be understood that the first and second units 20 and 30 may be rear and front units of the foldable personal mobility vehicle 10.

FIGS. 5 and 6 are enlarged views of the first and second units 20 and 30 of the foldable personal mobility vehicle 10. The first and second units 20 and 30 maybe formed in a die cast process, an extrusion process or any other suitable process known in the art. In the best mode of carrying out the invention, the first and second units 20 and 30 are manufactured in a die cast process. The die cast process provides a smaller, lighter and stronger foldable personal mobility vehicle 10 having less material and fewer assembly procedures for production. In addition, the foldable personal mobility vehicle 10 is easier to disassemble than the personal mobility vehicles of the prior art having a conventional frame.

The first end 21 of the first unit 20 comprises bore 24 located between plural foot rests 26. Preferably, a matrix of ribs 28 are formed integrally in the bottom of the first unit 20 for providing improved strength to the first unit 20.

The first end 31 of the second unit 30 comprises a slot 34 for receiving a portion of the second end 22 of the first unit 20. A bar 36 is located at the second end 32 of the second unit 30. Preferably, a matrix of ribs 38 are formed integrally in the bottom of the second unit 30 for providing improved strength to the second unit 30.

A pivot 40 connects the second end 22 of the first unit 20 to the first end of the second unit 30. A first pivot aperture 41 is defined in the second end 22 of the first unit 20 whereas a second pivot aperture 42 is defined in the first end 31 of the second unit 30. A pivot pin 43 extends through the first and second pivot apertures 41 and 42. The pivot pin 43 is fixed within the first pivot aperture 41 by a pin lock 45. The pin lock 45 may comprise a keyed shaft, a non-cylindrical shaped shaft as shown in FIG. 5, a conventional fastener or any suitable means for securing the pivot pin 43 to the first unit 20. The pin lock 45 fixes the pivot pin 43 to the first unit 20 to rotate the pivot pin 43 upon rotation of the first unit 20.

A first wheel unit 50 supports the first unit 20 of the foldable personal mobility vehicle 10. In this embodiment, the first wheel unit 50 comprises plural wheels 51 and 52 rotatably mounted on an axle 53. Although the first wheel unit 50 has been shown to include plural wheels 51 and 52, it should be understood that the present invention may be utilized with a single first wheel.

The plural wheels 51 and 52 of the first wheel unit 50 are rotatably mounted to the first end 21 of the first unit 20 by a first wheel pivot 54. The first pivot comprises a shaft 56 journaled within the bore 24 of the first unit 20. The first wheel pivot 54 is disposed substantially normal to the axle 53 for enabling the plural wheels 51 and 52 to steer the foldable personal mobility vehicle 10.

FIG. 7 is a rear view of the foldable personal mobility vehicle 10. A second wheel unit 60 supports the second unit 30 of the foldable personal mobility vehicle 10. In this embodiment, the second wheel unit 60 comprises plural wheels 61 and 62 rotatably mounted on an axle 63. The axle 63 of the second unit 30 is substantially parallel to the axle 53 of the first unit 20 and is substantially parallel to the pivot pin 43. The second wheel unit 60 is secured to the second end 32 of the second unit 30.

FIGS. 8 and 8A are enlarged views illustrating the second unit 30 separated from the second wheel unit 60. The second wheel unit 60 includes a groove 64 defined in a surface 66 for receiving the bar 36 secured to the second end 32 of the second unit 30. Plural fasteners 68 extend through the second end 32 of the second unit 30 to engage with the second wheel unit 60 to secure the second unit 30 to the second wheel unit 60.

A drive unit 70 is incorporated into the second wheel unit 60 for moving the foldable personal mobility vehicle 10. The drive unit 70 includes an electric motor 72 connected through a transmission 74 for rotating the axle 63. Preferably, the transmission 74 includes a differential 76 for powering independent plural axles 63 to drive the plural wheels 61 and 62. Although the drive unit 70 is shown incorporated into the second wheel unit 60, it should be understood that the drive unit 70 may be incorporated into the first wheel unit 50.

The second wheel unit 60 and the drive unit 70 maybe readily removed from the second unit 30 by the operator upon the removal of the plural fasteners 68. Preferably, a disconnect electrical plug (not shown) connects the electric motor 72 to a power source for facilitating removal of the second wheel unit 60 to the second unit 30. The removal of the second wheel unit 60 including the drive unit 70 substantially reduces the weight of the foldable personal mobility vehicle 10. The reduced weight of the foldable personal mobility vehicle 10 facilitates the shipment, repair, transportation and/or storage of the foldable personal mobility vehicle 10.

Figure 1:
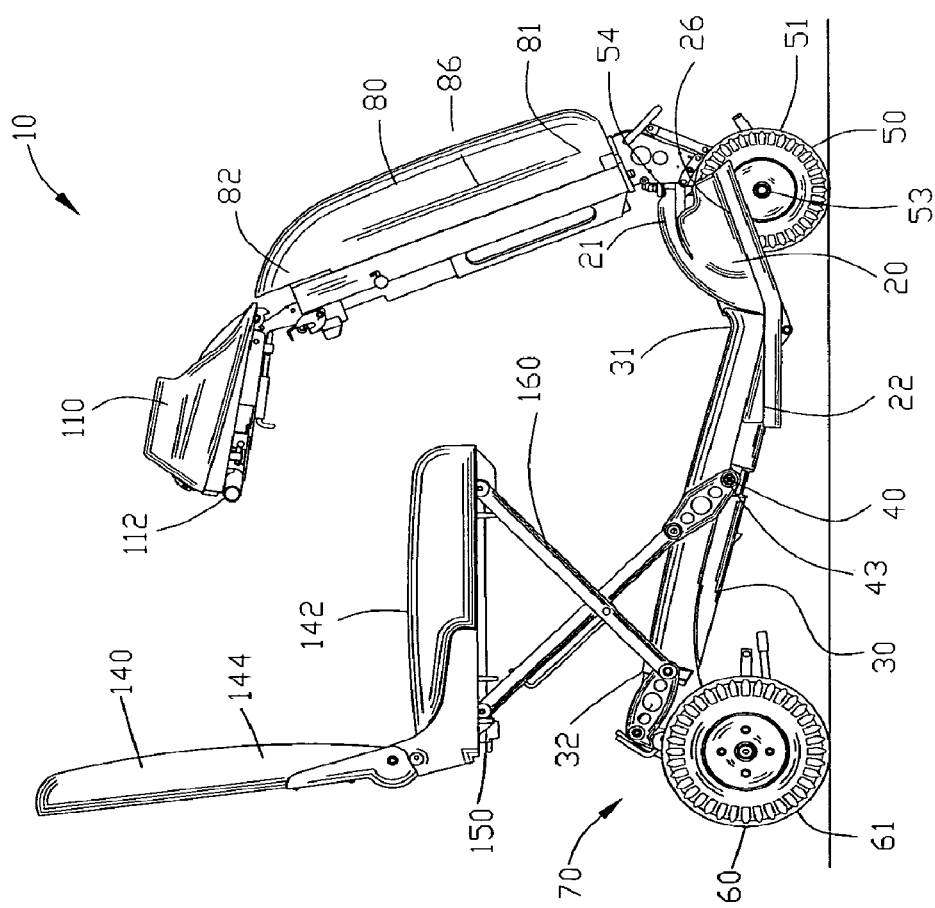
FIG. 1 is a side view of a first embodiment of a foldable personal mobility vehicle incorporating the present invention.
Figures 3, 4:
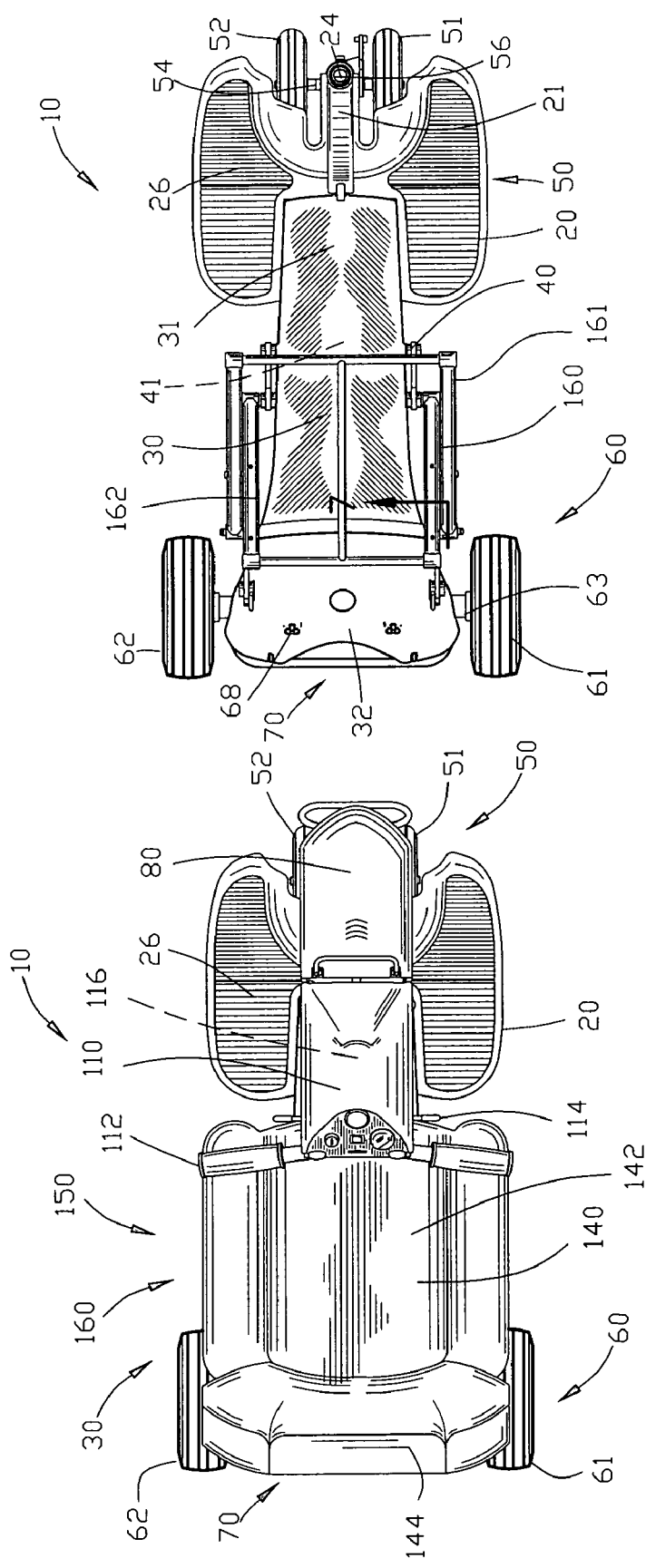
FIG. 3 is a top view of FIG. 1.
FIG. 4 is a view similar to FIG. 3 after removal of a chair.
Figure 9:
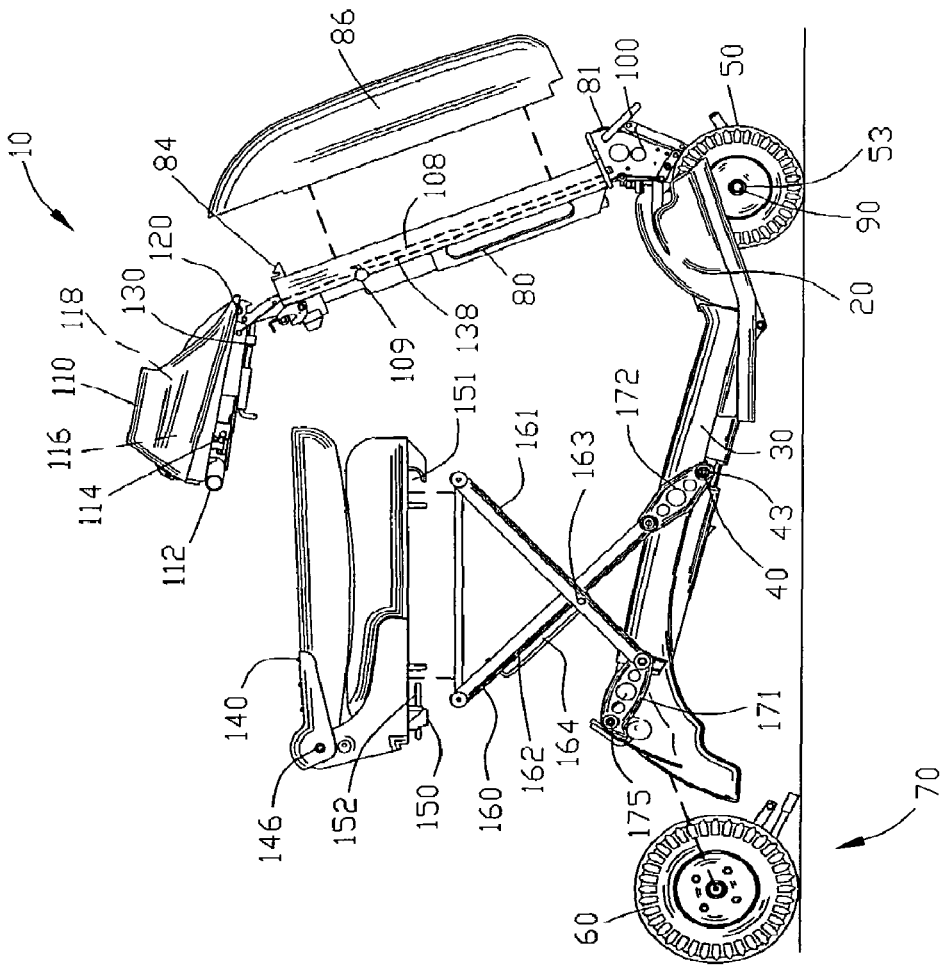
FIG. 9 is a side exploded view of FIG. 1 illustrating the disassembling of the foldable personal mobility vehicle including the removal of the drive unit, a chair and a battery.

FIG. 9 is a side view of the foldable personal mobility vehicle 10 of FIG. 1 in a disassembled form. The foldable personal mobility vehicle 10 includes a tiller unit 80 for pivoting the plural wheels 51 and 52 of the first wheel unit 50 for steering foldable personal mobility vehicle 10. In addition, the tiller unit 80 provides a lever arm for assisting in the folding of the foldable personal mobility vehicle 10.

The tiller unit 80 extends between a lower end 81 and an upper end 82. The lower end 81 of the tiller 80 is pivotably mounted to the first unit 20 by a tiller pivot 90. The tiller pivot 90 is coaxial with the axle 53 of the first unit 20 and is substantially parallel to the pivot pin 43. A tiller pivot lock 100 locks the pivotable position of the tiller unit 80 on the foldable personal mobility vehicle 10 as will be further discussed.

The upper end 82 of the tiller unit 80 pivotably supports a handlebar unit 110 through a handlebar pivot 120. A handlebar pivot lock 130 locks the pivotable position of the handlebar unit 110 relative to the tiller unit 80. The handlebar pivot lock 130 is described in greater detail hereinafter with reference to FIGS. 12 and 12A.

The tiller unit 80 includes a tiller mounting 84 for removably mounting a battery 86. Preferably, the tiller mounting 84 makes an automatic connection to the battery when the battery 86 is secured within the tiller mounting 84.

The handlebar unit 110 is mounted to the upper end 82 of the tiller unit 80 by the handlebar pivot 120. The handlebar unit 110 includes handlebars 112 for steering the foldable personal mobility vehicle 10. A control switch 114 is located on the handlebar unit 110 for manipulation by an operator. The control switch 114 is connected to an electrical control 116 for controlling the electric motor 72 of the drive unit 70. The control switch 114 enables the operator to control the speed and direction of the foldable personal mobility vehicle 10. The electrical control 116 may include a battery charger for charging the battery 86 by simply connecting the electrical control 116 to a conventional AC outlet.

The foldable personal mobility vehicle 10 includes a chair unit 140 mounted to the second unit 30 by a chair coupling 150 and a chair support 160. In this embodiment of the invention, the chair coupling 150 removably secures the chair 140 to the chair support 160. The chair unit 140 comprises a seat 142 with a backrest 144 pivotably mounted to the seat 142 by a chair pivot 146. The backrest 144 is pivotably mounted to the seat 142 by the chair pivot 146 for movement between an operating position shown in FIGS. 1 and 4 and a folded position shown in FIG. 9.

The chair unit 140 is supported by the chair support 160 extending from the second unit 30 of the personal mobility vehicle 10. The chair support 160 is a foldable support for movement between a raised position as shown in FIG. 9 and a lowered position as shown in FIG. 10.

The chair coupling 150 comprises a first and a second chair pivot 151 and 152 for removably securing the chair unit 140 to the foldable personal mobility vehicle 10. The chair support 160 comprises a first and a second U-shape support 161 and 162. The first and second chair pivots 151 and 152 pivotably connect the first and second U-shape supports 161 and 162 to the chair unit 140. The first U-shape support 161 is slidably connected to the second U-shape support 162 by a pin 163 sliding within a slot 164.

A first and a second pivot link 171 and 172 pivotably connect the first and second U-shape supports 161 and 162 to the foldable personal mobility vehicle 10. Pivots 173 and 174 connect the first and second pivot links 171 and 172 to the first and second U-shape supports 161 and 162. The first pivot link 171 is connected to the foldable personal mobility vehicle 10 by a freely rotating pivot 175. The second pivot link 172 is connected to the pivot pin 43 of the foldable personal mobility vehicle 10.

Figure 10:
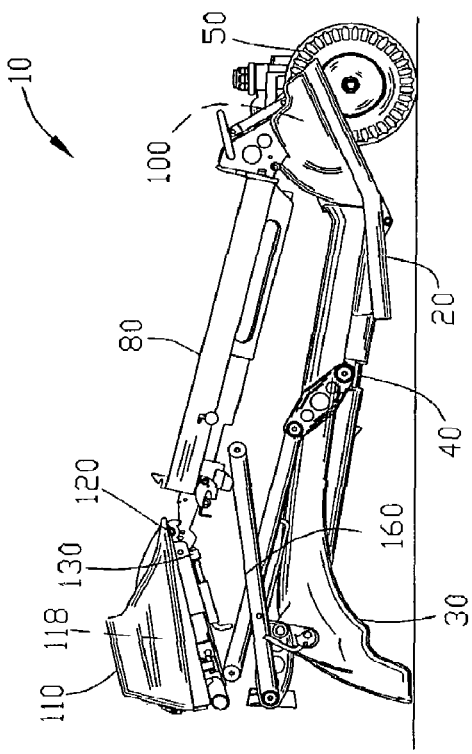
FIG. 10 is a side view illustrating a first method of folding the disassembled personal mobility vehicle of FIG. 9.

FIG. 10 is a side view illustrating a first method of folding the disassembled personal mobility vehicle 10 of FIG. 9. The handlebar pivot lock 130 is disengaged for enabling the pivoting of the handlebar unit 110 on the handlebar pivot 120 to be substantially aligned with the tiller unit 80. The tiller pivot lock 100 is disengaged for enabling the tiller unit 80 to pivot on the disassembled personal mobility vehicle 10 to be substantially parallel to the first and second units 20 and 30.

The foldable personal mobility vehicle 10 may be rapidly disassembled as shown in FIG. 9 by an unskilled operator. The disassembled personal mobility vehicle 10 may be folded in the first method of folding for enabling the foldable personal mobility vehicle 10 to be stored or transported in a disassembled form as shown in FIG. 10. The disassembled personal mobility vehicle 10 may be reassembled rapidly for operation.

Figure 11:
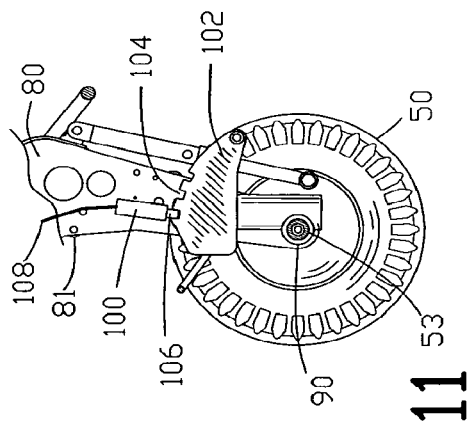
FIG. 11 is an enlarged side view of FIG. 1 illustrating the engagement of a tiller pivot lock for preventing the pivoting of a tiller unit of the foldable personal mobility vehicle.

FIG. 11 is an enlarged side view of a portion of FIG. 1 illustrating the engagement of a tiller pivot lock 100 for preventing the pivoting of a tiller unit 80 of the foldable personal mobility vehicle 10. In this example, the tiller pivot 90 is pivotably mounted to the axle 53 of the first wheel unit 50. The tiller pivot lock 100 comprises a locking plate 102 secured to the first wheel unit 50 for rotation with the shaft 56. The locking plate 102 includes a plurality of detents 104 distributed along an arc about the about the axle 53. A broach pin 106 is biased by a spring (not shown) into engagement with one of the plurality of detents 104. A cable 108 connects the broach pin 106 to a handle 109 mounted on the tiller unit 80.

Figure 11A:
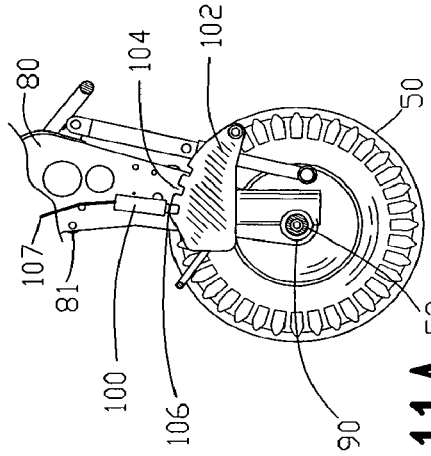
FIG. 11A is a view similar to FIG. 11 illustrating the disengagement of the tiller pivot lock for enabling the pivoting of the tiller unit of the foldable personal mobility vehicle.

FIG. 11A is a view similar to FIG. 11 illustrating the disengagement of the tiller pivot lock 100 for enabling the pivoting of the tiller unit 90 of the foldable personal mobility vehicle 10. Upon the actuation of the handle 109 located on the tiller unit 90 by the operator, the broach pin 106 is withdrawn from the plurality of detents 104 for enabling the tiller unit 80 to pivot about the axle 53 of the first wheel unit 50.

The actuation of the handle 109 enables the tiller unit 90 to be pivoted into a position substantially parallel to the first and second units 20 and 30 of the personal mobility vehicle 10 as shown in FIG. 10. Upon the release of the handle 109, the spring (not shown) biases the broach pin 106 into engagement with one of the plurality of detents 104 to fix the pivotable position of the tiller unit 80.

Figure 12:
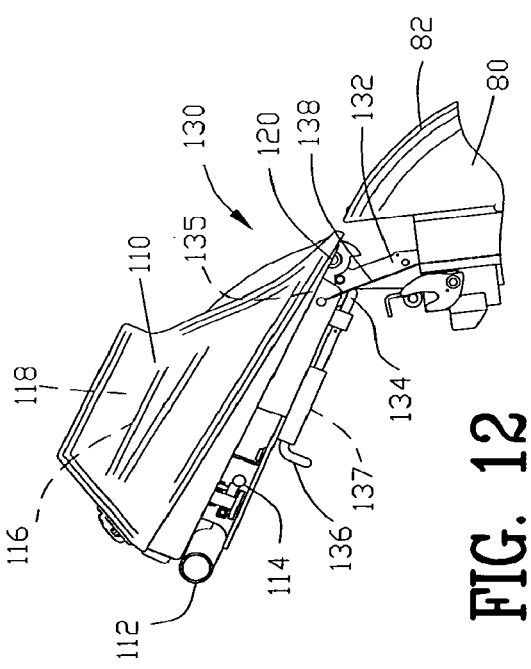
FIG. 12 is an enlarged side view of FIG. 1 illustrating the engagement of a handlebar pivot lock for preventing the pivoting of a handlebar unit of the foldable personal mobility vehicle.
Figure 12A:
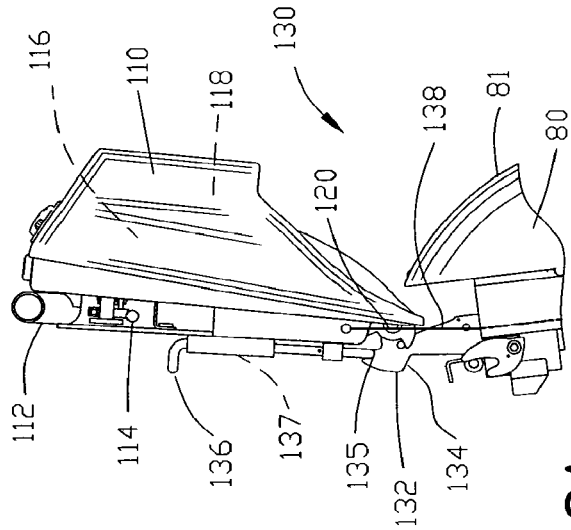
FIG. 12A is a view similar to FIG. 12 illustrating the disengagement of the handlebar pivot lock for enabling the pivoting of the handlebar unit of the foldable personal mobility vehicle.

FIG. 12 is an enlarged side view of FIG. 1 illustrating handlebar unit 110 mounted to the upper end 82 of the tiller unit 80 by the handlebar pivot 120. As best shown in FIG. 12A, the handlebar pivot lock 130 comprises a locking plate 132 secured to the tiller unit 80. The locking plate 132 includes plural of detents 134 and 135 defined in the locking plate 132. A release pin 136 is biased by a spring 137 into engagement with the detent 134 defined in the locking plate 132.

A cable 138 is fixed to the handlebar unit 110. The cable 138 is pulled or withdrawn upon pivoting of the handlebar unit 110 from the position shown in FIG. 12 to the position shown in FIG. 12A. As will be described in greater detail hereinafter, the cable 138 is connected to a brake 180 for inhibiting rotation of the plural wheels 51 and 52 of the first wheel unit 50.

FIG. 12A is a view similar to FIG. 12 illustrating the disengagement of the handlebar pivot lock 130 for enabling the pivoting of the handlebar unit 110. Upon the withdrawal of the release pin 136, the handlebar unit 110 may be pivoted from the position shown in FIG. 12 to the position shown in FIG. 12A. When the release pin 136 is released, the release pin 136 is biased by the spring 137 into engagement with the detent 136 defined in the locking plate 132 for securing the handlebar unit 110 in the position shown in FIG. 12A.

FIGS. 13-16 illustrate a second method of folding the foldable personal mobility vehicle 10 of FIG. 1. FIG. 13 is a side view similar to FIG. 1 illustrating the backrest 144 pivoted into the folded position. In the folded position, the backrest 144 is in a position generally parallel to the seat 142. The backrest 144 is pivoted into the folded position for storage or transportation of the personal mobility vehicle 10.

FIG. 14 is a side view similar to FIG. 13 illustrating the initial lowering of the chair unit 140 on the foldable personal mobility vehicle 10. The pivot link 171 is shown partially pivoted counterclockwise about the pivot 175. In this example, the pivoting of the pivot link 171 is effected by manually pivoting the pivot link 171 by an operator. The pivoting of the pivot link 171 moves the end of the first U-shape support 161 outwardly from the end of the second U-shape support 162.

FIG. 15 is a side view similar to FIG. 14 illustrating the continued lowering of the chair unit 140 on the foldable personal mobility vehicle 10. The pivot link 171 is shown further pivoted counterclockwise about the pivot 175 for further moving the end of the first U-shape support 161 outwardly from the end of the second U-shape support 162.

FIG. 16 is a side view similar to FIG. 15 illustrating the complete lowering of the chair unit 140 on the foldable personal mobility vehicle 10. The pivot link 171 is shown fully pivoted counterclockwise about the pivot 175 for moving the location of the end of the first U-shape support 171. When the chair unit 140 is in the fully lowered position, the seat 142 of the chair unit 140 engages with the foldable personal mobility vehicle 10.

FIG. 16 further illustrates the handlebar unit 110 pivoted on the handlebar pivot 120 to be substantially in alignment with the tiller unit 80. The tiller unit 80 is pivoted on the tiller pivot 90 to be substantially parallel with the foldable personal mobility vehicle 10. The pivoting of the tiller unit 80 and the handlebar unit 110 enables the fully assembled foldable personal mobility vehicle 10 to be folded in a second manner for the transportation and storage of the foldable personal mobility vehicle 10.

FIG. 17 is a side view of the foldable personal mobility vehicle 10 of FIG. 1 illustrating the pivoting of a handlebar unit 110 for actuating the brake 180 for the plural first wheels 51 and 52 and for disengaging the tiller pivot lock 100 for enabling the pivoting of the tiller unit 80 of the foldable personal mobility vehicle 10. The handlebar unit 110 may be pivoted independently on the handlebar pivot 120. The handlebar unit 110 may be pivoted on the handlebar pivot 120 into the raised position as shown in FIG. 12A for facilitating ingress and egress of the operator from the foldable personal mobility vehicle 10.

FIG. 17A is an enlarged view illustrating a cable interconnection 190 for simultaneously actuating the brake 180 and the tiller pivot lock 100. The cable interconnection 190 includes a cable terminator 192 secured to the end of the cable 108 extending from the tiller pivot lock 100. The handle 109 is secured to the cable interconnection 190 for withdrawing the broach pin 106 from one of the detents 134 and 135 upon the actuation of the handle 109.

The cable terminator 192 includes a bore 194 for enabling the cable 138 of the handlebar pivot lock 130 to pass through the bore 194. A ring 196 is affixed to the cable 138 for providing an interference fit with the bore 194 of the cable terminator 192.

FIG. 17B is an enlarged side view of a portion of FIG. 17 illustrating the brake 180 in an actuated condition. The brake 180 comprises a brake lever 182 mounted by a brake lever pivot 184 to the first wheel unit 50. The cable 138 is connected to a one end of the brake lever 182. A brake rod 186 extends from the opposed end of the brake lever 182. When the handlebar unit 110 is pivoted on the handlebar pivot 120, the cable 138 is moved upwardly in FIG. 17B to pivot the brake lever 182. The brake rod 186 is moved into engagement with the plural wheels 51 and 52 to inhibit rotation of the plural wheels 51 and 52 of the first wheel unit 50.

FIG. 17C is a view similar to FIG. 17 illustrating the disengagement of the tiller pivot lock 100 for enabling the pivoting of the tiller unit 80 of the foldable personal mobility vehicle 10. When the handlebar unit 110 is pivoted on the handlebar pivot 120, the cable 138 is moved upwardly in FIG. 17A to withdraw the broach pin 106 from one of the detents 134 and 135 in the locking plate 132.

As the cable 138 is moved upwardly in FIG. 17A, the ring affixed to the cable 138 engages the cable terminator 192 and moves the cable terminator 192 upwardly in FIG. 17A. The upward movement of the cable terminator 192 withdraws the broach pin 106 from one of the plurality of detents 104 for enabling the tiller unit 80 to pivot about the axle 53 of the first wheel unit 50.

Figure 18A:
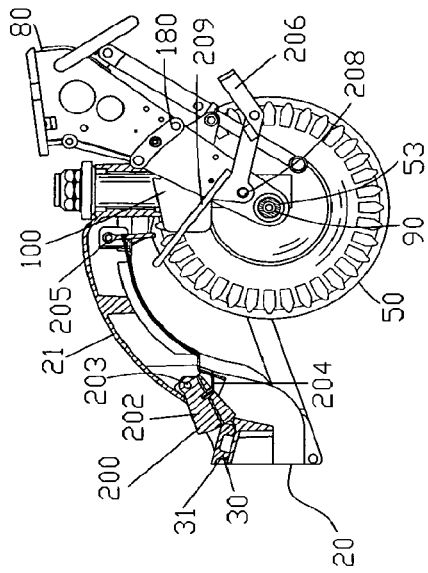
FIG. 18A is an enlarged side view of a portion of FIG. 13 illustrating the engagement of a pivot lock of the foldable personal mobility vehicle.
Figure 18B:
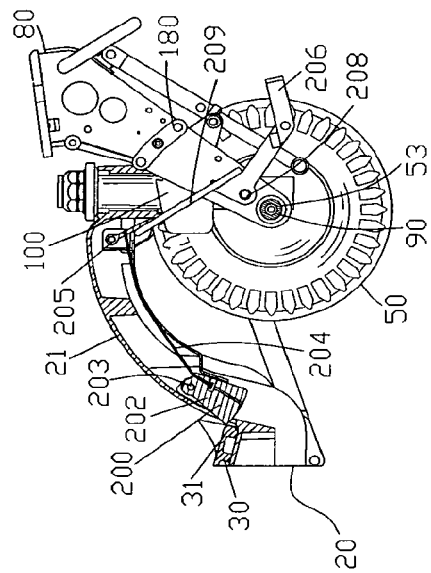
FIG. 18B is a view similar to FIG. 18A illustrating the disengagement of the pivot lock for enabling the pivoting of the foldable personal mobility vehicle.
Figure 18:
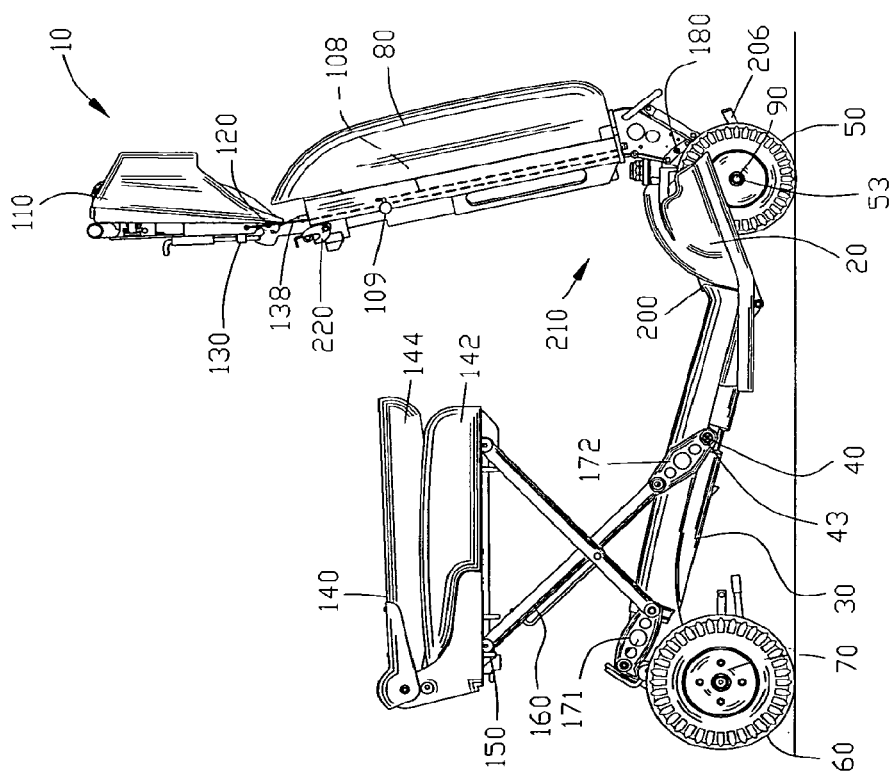
FIG. 18 is a side view similar to FIG. 17 illustrating the pivoting of the tiller unit.

The pivoting of a handlebar unit 110 into the upright position as shown in FIG. 18 actuates a position switch 118 located within the handlebar unit 110. The position switch 118 is connected for switching the electrical control 116 into a low speed mode. The low speed mode enables the electrical control 116 to power the electric motor 72 in a low speed operation.

FIGS. 18-22 illustrate a third method of folding the foldable personal mobility vehicle 10 of FIG. 1. FIG. 18 is a side view similar to FIG. 17 illustrating the pivoting of the tiller unit 80 about the tiller pivot 90. The backrest 144 is shown pivoted into a folded position. Preferably, the operator is located in a standing position in front of the first unit 20 and facing the second unit 30 to fold the foldable personal mobility vehicle 10.

FIG. 18A is an enlarged side view of a portion of FIG. 13 illustrating the engagement of a pivot lock 200 of the foldable personal mobility vehicle 10. The pivot lock 200 comprises a stop 202 pivotably mounted by a stop pivot 203 to the first unit 20. A cable 204 is connected between the stop 202 and an operator 205. A foot lever 206 is mounted to the first wheel unit 50 by a foot lever pivot 208. The foot lever 206 includes an actuation bar 209.

FIG. 18B is a view similar to FIG. 18A illustrating the disengagement of the pivot lock 200 for enabling the pivoting of the foldable personal mobility vehicle 10. Upon the depression of the foot lever 206 by a foot of an operator, the actuation bar 209 engages with the operator 205 for pivoting the stop 202 through cable 204. The pivoting of the stop 202 disengages the pivot lock 200 for enabling the first unit 20 to pivot to the second unit 30 of the foldable personal mobility vehicle 10.

The foldable personal mobility vehicle 10 includes a pivot assist 210 for pivoting the first unit 20 relative to the second unit 30 for folding the personal mobility vehicle 10 about the pivot axis. The pivot assist 210 enables the foldable personal mobility vehicle 10 to be folded with reduced effort by the operator.

FIGS. 18-22 illustrate the pivot assist 210 as comprising the brake 180 for braking the first wheels 51 and 52 in combination with the drive unit 70 rotating the second wheel 61 and 62. The foldable personal mobility vehicle 10 may be folded without the bending or stooping by the operator by driving the second wheels 61 and 62 toward the braked first wheels 51 and 52.

In order to fold the foldable personal mobility vehicle 10, the operator engages the brake 180 and disengages the pivot lock 210. The drive unit 70 is actuated in forward direction at the low speed for driving the second wheels 61 and 62 toward the braked first wheels 51 and 52.

Figures 19, 20:
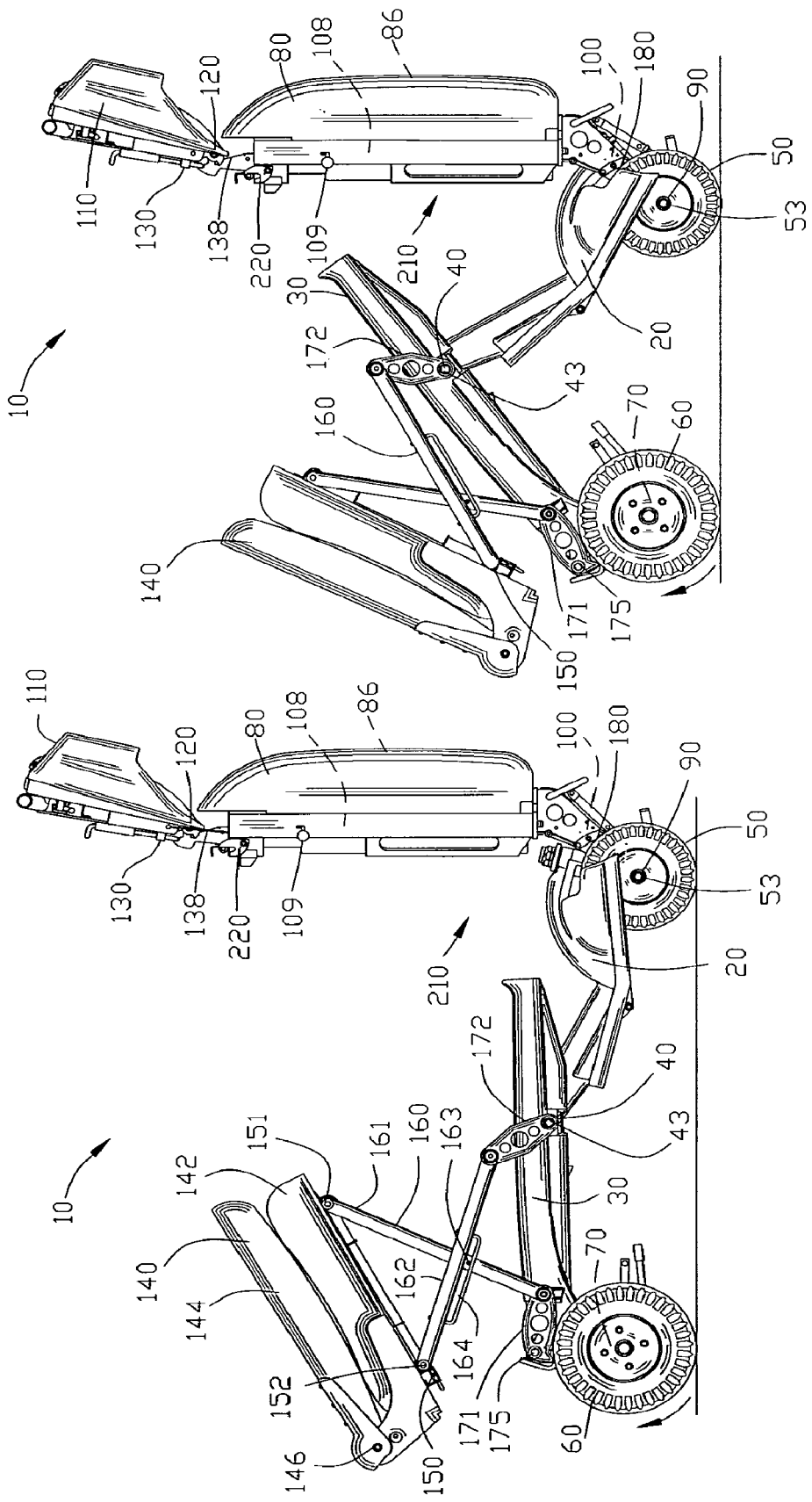
FIG. 19 is a side view similar to FIG. 18 illustrating the initial alternate folding of the first unit relative to the second unit of the foldable personal mobility vehicle of FIG. 1.
FIG. 20 is a side view similar to FIG. 19 illustrating the further alternate folding of the first unit relative to the second unit of the foldable personal mobility vehicle.

FIG. 19 is a view similar to FIG. 18 illustrating the initial folding of the first unit 20 relative to the second unit 30 of the foldable personal mobility vehicle 10 of FIG. 1. As the drive unit 70 drives the second wheels 61 and 62 toward the braked first wheels 51 and 52, the first unit 20 rotates in a clockwise direction about the pivot 40 and the second unit 30 rotates in a counterclockwise direction about the pivot 40.

The pivot pin 43 rotates in unison with the first unit 20. As the first unit 20 rotates in a clockwise direction, the pivot pin 43 rotates in a clockwise direction relative to the second unit 30. The clockwise rotation of the pivot pin 43 rotates the second pivot link 172 in a clockwise direction relative to the second unit 30.

The pivot link 172 is shown partially pivoted in a clockwise direction by the pivot pin 43. The pivoting of the pivot link 172 moves the end of the second U-shape support 162 away from the end of the first U-shape support 161. The movement the end of the second U-shape support 162 away from the end of the first U-shape support 161 lowers the chair unit 140 relative to the second unit 30 of the foldable personal mobility vehicle 10.

FIG. 20 is a view similar to FIG. 19 illustrating the further folding of the first unit 20 relative to the second unit 30 of the foldable personal mobility vehicle 30. The continued movement of the second wheels 61 and 62 toward the braked first wheels 51 and 52 continues to rotate the first unit 20 in the clockwise direction and continues to rotate the second unit 30 in the counterclockwise direction. The continued rotation of the first unit 20 in the clockwise direction continues to rotate the second pivot link 172 to lower the chair unit 140 relative to the second unit 30 of the foldable personal mobility vehicle 10.

Figures 21, 22:
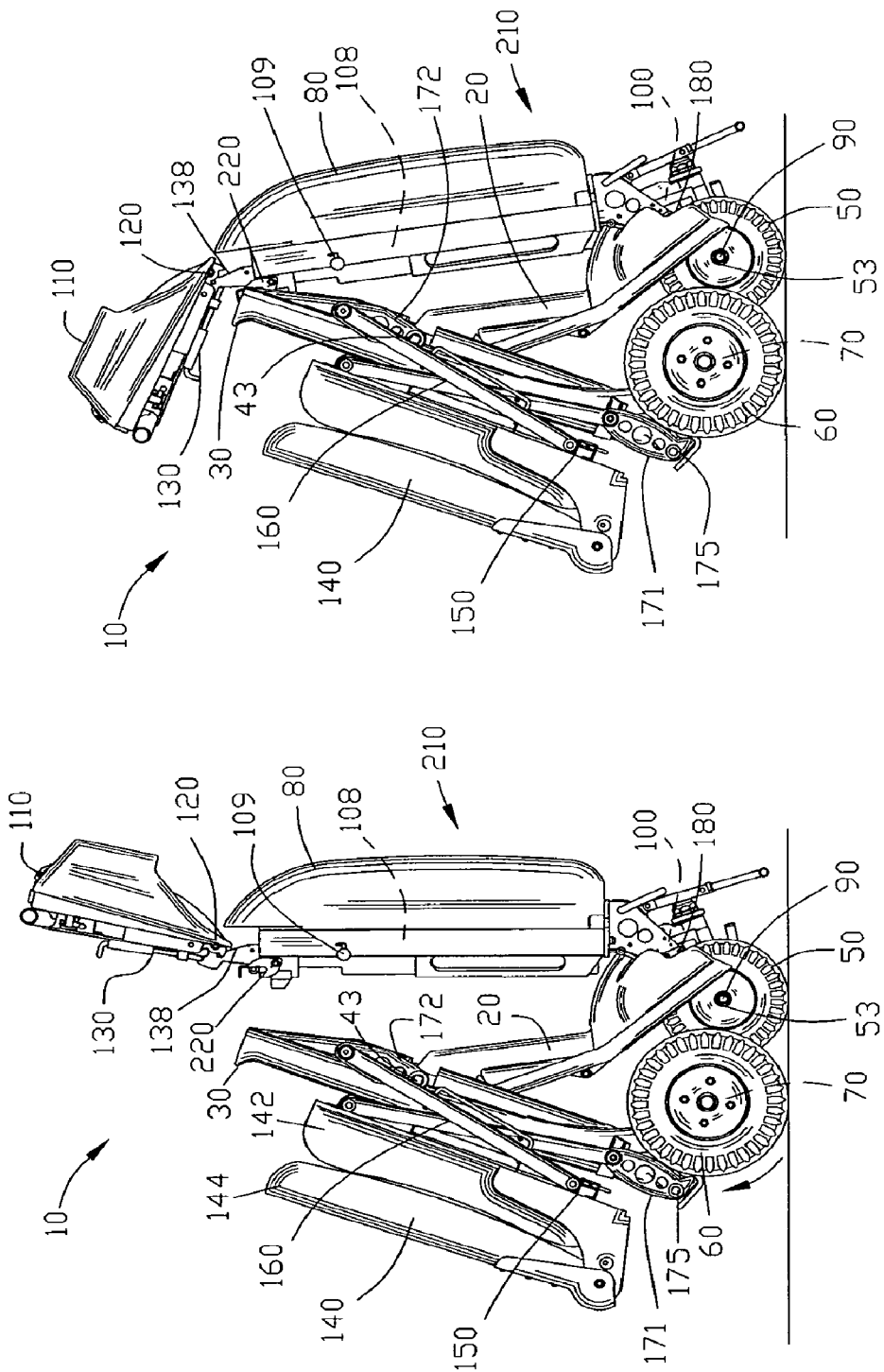
FIG. 21 is a side view similar to FIG. 20 illustrating the complete alternate folding of the first unit relative to the second unit of the foldable personal mobility vehicle.
FIG. 22 is a side view similar to FIG. 21 illustrating the latching of the second unit to the first unit in the folded position.

FIG. 21 is a view similar to FIG. 20 illustrating the complete folding of the first unit 20 relative to the second unit 30 of the foldable personal mobility vehicle 10. The pivot link 172 is shown fully pivoted clockwise by the pivot pin 43 for completely lowering of the chair unit 140 on the foldable personal mobility vehicle 10. When the chair unit 140 is in the fully lowered position, the seat 142 of the chair unit 140 engages with the foldable personal mobility vehicle 10.

FIG. 22 is a view similar to FIG. 21 illustrating the latching of the first and second units 20 and 30 of the completely folded foldable personal mobility vehicle 10. The completely folded foldable personal mobility vehicle 10 is capable of stand-up storage. The first wheel 51 and 52 are located adjacent to the second wheels 61 and 62 of the foldable personal mobility vehicle 10 to provide a compressed wheelbase. The completely folded foldable personal mobility vehicle 10 may be rolled in the folded condition. Furthermore, the foldable personal mobility vehicle 10 may be moved in a folded condition by energizing the drive unit 70.

FIG. 23 is an enlarged view of a portion of FIG. 22 illustrating the initial latching of the second unit 30 to the first unit 20. A latch 220 comprises a pin 222 secured to the first end 31 of the second member 30. A catch 224 is pivotably secured to the tiller unit 80 by a catch pivot 226. The catch 224 includes a slot 228. The pin 222 is received within the slot 228 of the catch 224 in a conventional manner.

FIG. 24 is a view similar to FIG. 23 illustrating the final latching of the second unit 30 to the first unit 20. The catch 224 with the received pin 222 pivots about the catch pivot 226. A keeper 230 is pivotably mounted adjacent to the latch 220 by a keeper pivot 232. The keeper includes a locking bar 236 for engaging with the slot 228 for locking the second unit 30 to the tiller unit 80 in the folded position. A release (not shown) may be provided for disengaging the locking bar 236 from the slot 228 for unlocking the second unit 30 from the tiller unit 80.

FIG. 25 is a view similar to FIG. 24 illustrating the engagement of the handlebar pivot lock 130. After the second unit 30 is locked to the tiller unit 80 in the folded position, the handlebar unit 110 may be pivoted into the position shown in FIG. 25. Upon the withdrawal of the release pin 136, the handlebar unit 110 may be pivoted from the position shown in FIG. 24 to the position shown in FIG. 25. When the release pin 136 is released, the release pin 136 is biased by the spring 137 into engagement with the detent 134 defined in the locking plate 132 for securing the handlebar unit 110 in the position shown in FIG. 25.

Preferably, the pivoting of the first unit 20 relative to the second unit 30 actuates a switch (not shown) connected for maintaining the electrical control 116 into the low speed mode. The low speed mode enables the electrical control 116 to power the electric motor 72 in a low speed operation for moving the foldable personal mobility vehicle 10 by the electric motor 72 in the folded position.

FIG. 26 is a view similar to FIG. 18 illustrating an alternate embodiment of the personal mobility vehicle 10A of the present invention. The foldable personal mobility vehicle 10A comprises the first and second units 20A and 30A. In this example, the first and second units 20A and 30A are shown as front and rear units of the foldable personal mobility vehicle 10. The pivot 40A connects the first unit 20A to second unit 30A as set forth previously.

The first wheel unit 50A supports the first unit 20A of the foldable personal mobility vehicle 10A. The first wheel unit 50A comprises plural wheels 51A and 52A rotatably mounted on the axle 53A. The plural wheels 51A and 52A are rotatably mounted to the first unit 20A for enabling the plural wheels 51A and 52A to steer the foldable personal mobility vehicle 10A.

The second wheel unit 60A supports the second unit 30A of the foldable personal mobility vehicle 10A. The second wheel unit 60A comprises plural wheels 61A and 62A rotatably mounted on the axle 63A.

In this alternate embodiment of the personal mobility vehicle 10A, the drive unit 70A is incorporated into the first wheel unit 50A for moving the foldable personal mobility vehicle 10A. The drive unit 70A includes an electric motor 72A connected for rotating the axle 53A.

In this alternate embodiment of the personal mobility vehicle 10A, the brake 180A is incorporated into the second wheel unit 60A for inhibiting rotation of the plural wheels 61A and 62A of the foldable personal mobility vehicle 10A. The brake 180A comprises a brake lever 182A for actuating the brake 180A of the plural wheels 61A and 62A.

FIG. 27 is a view similar to FIG. 26 illustrating the alternate embodiment of the personal mobility vehicle 10A in a partially folded position in a manner similar to the personal mobility vehicle 10A shown in FIG. 20. As the drive unit 70A drives the first wheels 51A and 52A toward the braked second wheels 61A and 62A, the first unit 20A rotates in a clockwise direction about the pivot 40A and the second unit 30A rotates in a counterclockwise direction about the pivot 40A. The rotation of the first unit 20A in the clockwise direction lowers the chair unit 140 relative to the second unit 30A of the foldable personal mobility vehicle 10A as described previously.

The drive unit 70A continues to drive the first wheels 51A and 52A toward the braked second wheel 61A and 62A until the foldable personal mobility vehicle 10A is folded in a manner similar to FIG. 22.

FIG. 28 is a side view of a second embodiment of a foldable personal mobility vehicle 310 incorporating the present invention. Similar parts are labeled with similar reference characters raised by a multiple of one hundred. In this example of the invention, the personal mobility vehicle 310 is shown as an electrically powered wheel chair.

The foldable personal mobility vehicle 310 comprises a first unit 320 and a second unit 330. A pivot 340 connects the first unit 320 to the second unit 330. A first wheel unit 350 supports the first unit 320. In this embodiment, the first wheel unit 350 includes caster wheels 351 and 352. A brake 480 such as a conventional caster brake is adapted to lock the casters wheels 351 and 352.

A second wheel unit 360 supports the second unit 330. The second wheel unit 360 includes plural wheels 361 and 362 and a drive unit 370 shown as plural drive units 371 and 372 for independently driving the plural second wheels 361 and 362. The independently driven plural second wheels 361 and 362 are adapted for controlling the speed and direction of the foldable personal mobility vehicle 310. A control joy stick 410 enables an operator to control the speed and direction of the foldable personal mobility vehicle 310. In the alternative, the plural second wheels 361 and 362 may be rotated manually for moving the foldable personal mobility vehicle 310.

FIG. 29 is a side view similar to FIG. 28 illustrating the complete folding of the foldable personal mobility vehicle 310. The completely folded foldable personal mobility vehicle 310 is capable of stand-up storage with a compressed wheelbase. The completely folded foldable personal mobility vehicle 10 may be rolled in the folded condition or may be move by energizing the drive motors 371 and 372.

In the first method of folding as shown in FIG. 10, the tiller unit 80 is folded to be substantially parallel to the first and second units 20 and 30 of the folding personal mobility vehicle 10. In this first method, the foldable personal mobility vehicle 10 may be folded manually in the disassembled form.

In the second method of folding as shown in FIGS. 13-16, the chair support 160 is manually folded from the raised position as shown in FIG. 13 to the lowered position as shown in FIG. 16. The tiller unit 80 is manually folded to be substantially parallel to the first and second units 20 and 30 of the folding personal mobility vehicle 16.

In the third method of folding as shown in FIGS. 18-22, the first unit 20 is folded relative to the second unit 30 of the foldable personal mobility vehicle 10. The chair support 160 is automatically folded from the raised position as shown in FIG. 18 to the lowered position as shown in FIG. 22. The first unit 20 is folded relative to the second unit 30 by the pivot assist unit 210. The pivot assist unit 210 may take various forms for assisting in the pivoting of the first unit 20 is folded relative to the second unit 30.

Figure 30:
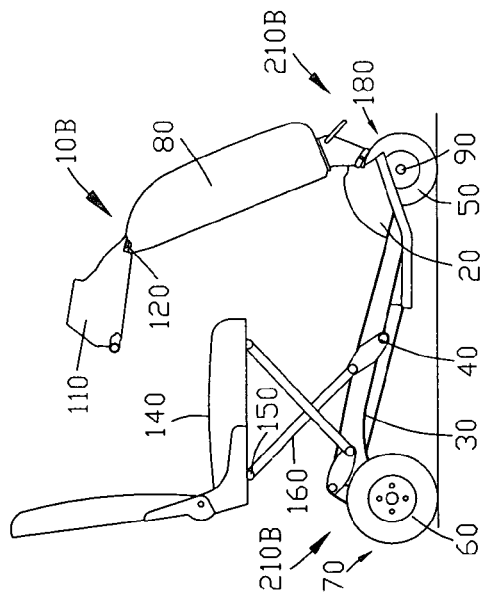
FIG. 30 is a symbolic representation of a first embodiment of a manual operated pivot assist unit for folding the foldable personal mobility vehicle.

FIG. 30 is a symbolic representation of a first embodiment of the pivot assist unit 210A. The first embodiment of the pivot assist unit 210A is characterized as a manual operated pivot assist unit 210A comprising the tiller unit 80 acting as a lever to fold the first unit 20 relative to the second unit 30 as shown in FIGS. 18-22.

Figure 31:
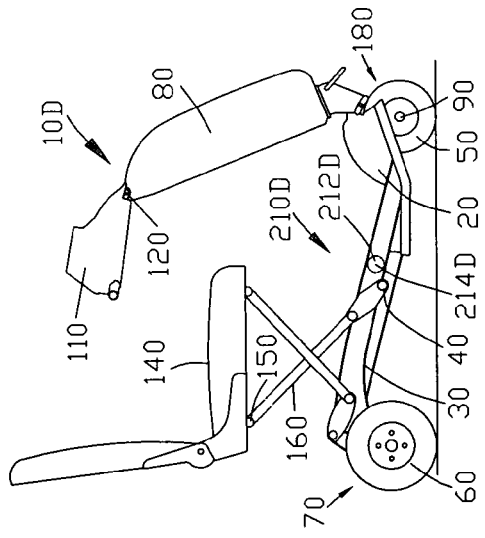
FIG. 31 is a symbolic representation of a second embodiment of a power operated pivot assist unit for folding the foldable personal mobility vehicle.

FIG. 31 is a symbolic representation of a second embodiment of the pivot assist unit 210B. The second embodiment of the pivot assist unit 210B is characterized as a power operated pivot assist unit 210B comprising the drive unit 70 and the brake unit 180 cooperating to fold the first unit 20 relative to the second unit 30 as shown in FIGS. 18-22.

Figure 32:
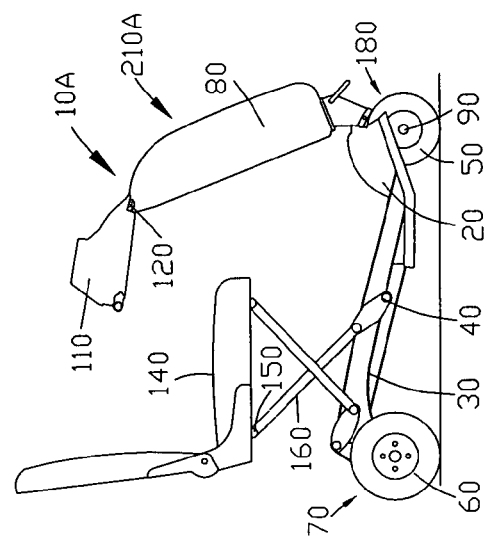
FIG. 32 is a symbolic representation of a third embodiment of a dedicated manual drive unit for folding the foldable personal mobility vehicle.

FIG. 32 is a symbolic representation of a third embodiment of the pivot assist unit 210C. The third embodiment of the pivot assist unit 210C is characterized as a manually operated pivot assist unit 210C comprising a manual operated dedicated drive unit 212C acting directly between the first and second units 20 and 30 to fold the first unit 20 relative to the second unit 30 as shown in FIGS. 18-22.

In this third embodiment of the pivot assist unit 210C, the first unit 20 is manually pivoted relative to the second unit 30 for folding the personal mobility vehicle 10 about the pivot 40 by an independent manually operated pivoting mechanism 214C. The manually operated pivoting mechanism 214C provides a mechanical advantage for the operator. The manually operated pivoting mechanism 214C may take the form of gears, cranks, levers or the like. In this example, the manually operated pivoting mechanism 214C is shown symbolically as a crank for folding the personal mobility vehicle 10 about the pivot 40.

Figure 33:
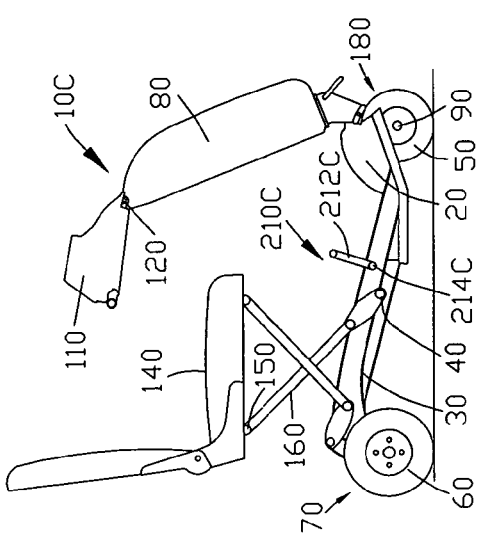
FIG. 33 is a symbolic representation of a fourth embodiment of a dedicated electrically powered drive unit for folding the foldable personal mobility vehicle.

FIG. 33 is a symbolic representation of a fourth embodiment of the pivot assist unit 210D. The fourth embodiment of the pivot assist unit 210D is characterized as a power operated pivot assist unit 210D comprising a dedicated drive unit including an electrically powered dedicated drive unit 212D acting directly between the first and second units 20 and 30 to fold the first unit 20 relative to the second unit 30 as shown in FIGS. 18-22. The electrically powered dedicated drive unit 212D is shown as an independent electrical pivoting motor 214D for folding the personal mobility vehicle 10 about the pivot 40.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A foldable personal mobility vehicle located on a surface, comprising:

a first unit including a first wheel being rotatable about a first axle;

said first wheel being movably mounted to said first unit;

a second unit including a second wheel being rotatable about a second axle;

a pivot having a pivot axis substantially parallel to said first and second axles for pivotably connecting said first unit to said second unit; and a pivot assist unit including a lever for pivoting said first unit about said first wheel causing said second wheel to move toward said first wheel while said first and second wheels are located on the surface for folding the personal mobility vehicle about said pivot axis with said pivot axis of said pivot moving above said first and said second wheels.

2. A foldable personal mobility vehicle as set forth in claim 1, wherein the foldable personal mobility vehicle is a scooter.

3. A foldable personal mobility vehicle as set forth in claim 1, wherein the foldable personal mobility vehicle is a wheel chair.

4. A foldable personal mobility vehicle as set forth in claim 1, wherein said first unit is a front unit of the foldable personal mobility vehicle and said second unit is a rear unit of the foldable personal mobility vehicle.

5. A foldable personal mobility vehicle as set forth in claim 1, wherein said first unit is a rear unit of the foldable personal mobility vehicle and said second unit is a front unit of the foldable personal mobility vehicle.

6. A foldable personal mobility vehicle as set forth in claim 1, wherein said first wheel is pivotably mounted to said first unit for steering the foldable personal mobility vehicle.

7. A foldable personal mobility vehicle as set forth in claim 1, including a drive unit for rotating said second wheel for moving the foldable personal mobility vehicle.

8. A foldable personal mobility vehicle as set forth in claim 1, wherein said second unit comprises plural second wheels; and a drive unit independently driving said plural second wheels for steering said foldable personal mobility vehicle.

9. A foldable personal mobility vehicle as set forth in claim 1, including a drive unit comprising an electric motor for rotating said second wheel for moving the foldable personal mobility vehicle.

10. A foldable personal mobility vehicle as set forth in claim 1, including a drive unit comprising an electric motor for rotating a drive axle connected to said second wheel; and said drive unit being removably secured to said second unit.

11. A foldable personal mobility vehicle as set forth in claim 1, wherein said pivot assist unit comprises an electrical motor for pivoting said first unit relative to said second unit for folding the personal mobility vehicle about said pivot axis.

12. A foldable personal mobility vehicle as set forth in claim 1, wherein said pivot assist unit comprises a drive unit for rotating said second wheel for assisting in the folding of the front unit relative to said rear unit for folding the personal mobility vehicle about said pivot axis.

13. A foldable personal mobility vehicle as set forth in claim 1, including a chair support for collapsibly mounting a chair to one of said first and second units.

14. A foldable personal mobility vehicle as set forth in claim 1, including a chair support for collapsibly mounting a chair to one of said first and second units; and a coupling interconnecting said chair support to said pivot axis for collapsing said chair upon folding of the foldable personal mobility vehicle.

15. A foldable personal mobility vehicle as set forth in claim 1, including a chair having a backrest pivotably mounted to a seat for pivoting between an operating position and a folded position.

16. A foldable personal mobility vehicle, comprising:
- a first unit including a first wheel being rotatable about a first axle;
- a second unit including a second wheel being rotatable about a second axle;
- a pivot having a pivot axis substantially parallel to said first and second axles for pivotably connecting said first unit to said second unit;
- a pivot assist unit including a lever for initially pivoting said first unit relative to said second unit for folding the personal mobility vehicle about said pivot axis;
- said pivot assist unit including a brake for braking said first wheel; and
- said pivot assist unit including a drive unit rotating said second wheel for moving said second wheel towards said first wheel concomitantly with the braking of said first wheel to continue to pivot said first unit relative to said second unit for folding the personal mobility vehicle about said pivot axis.

17. A foldable personal mobility vehicle, comprising:
- a first unit including a first wheel being rotatable about a first axle;
- a second unit including a second wheel being rotatable about a second axle;
- a pivot having a pivot axis substantially parallel to said first and second axles for pivotably connecting said first unit to said second unit;
- a pivot assist unit for pivoting said first unit relative to said second unit for folding the personal mobility vehicle about said pivot axis;
- a chair support for collapsibly mounting a chair to one of said first and second units;
- a coupling interconnecting said chair support to said pivot axis for collapsing said chair upon folding of the foldable personal mobility vehicle; and
- said collapsible chair being collapsible independent of the folding of the foldable personal mobility vehicle.

18. A foldable personal mobility vehicle, comprising:
- a first unit supporting a first wheel being rotatable about a first axle;
- a second unit supporting a second wheel being rotatable about a second axle;
- a brake for retarding said first wheel;
- an electrical motor drive unit for rotating said second wheel for moving the foldable personal mobility vehicle;
- a pivot having a pivot axis substantially parallel to said first and second axles for pivotably connecting said first unit to said second unit; and
- a pivot assist comprising said electrical motor drive unit rotating said second wheel concomitantly with said brake retarding said first wheel for folding the personal mobility vehicle about said pivot axis.

19. A foldable personal mobility vehicle as set forth in claim 18, wherein said first unit is a front unit of the foldable personal mobility vehicle and said second unit is a rear unit of the foldable personal mobility vehicle.

20. A foldable personal mobility vehicle as set forth in claim 18, wherein said first unit is a rear unit of the foldable personal mobility vehicle and said second unit is a front unit of the foldable personal mobility vehicle.

21. A foldable personal mobility vehicle as set forth in claim 18, wherein said first wheel is pivotably mounted to said first unit for steering the foldable personal mobility vehicle.

22. A foldable personal mobility vehicle as set forth in claim 18, wherein said second wheel is pivotably mounted to said second unit for steering the foldable personal mobility vehicle.

23. A foldable personal mobility vehicle, comprising:
- a first unit having a first wheel being rotatable about a first axle;
- a tiller pivotably supporting said first wheel on said first unit for steering said foldable personal mobility vehicle;
- a second unit supporting plural second wheels being rotatable about a second axle;
- an electrical motor drive unit for moving the foldable personal mobility vehicle;
- a pivot having a pivot axis substantially parallel to said first and second axles for pivotably connecting said first unit to said second unit; and
- a pivot assist unit comprising said tiller unit providing a lever arm for pivoting said first unit about said first wheel causing said second wheel to move toward said first wheel while said first and second wheels are located on the surface for folding of the front unit relative to said rear unit of the foldable personal mobility vehicle about said pivot axis with said pivot axis of said pivot moving above said first and said second wheels.

24. A foldable personal mobility vehicle as set forth in claim 23, wherein said electrical motor drive unit rotates said first axle for moving the foldable personal mobility vehicle.

25. A foldable personal mobility vehicle as set forth in claim 23, wherein said electrical motor drive unit rotates said second axle for moving the foldable personal mobility vehicle.

26. A foldable personal mobility vehicle for transporting an operator, comprising:
- a first unit having a first wheel being rotatable about a first axle;
- a tiller pivotably supporting said first wheel on said first unit for steering said foldable personal mobility vehicle;
- a second unit supporting plural second wheels being rotatable about a second axle;
- an electrical motor drive unit for moving the foldable personal mobility vehicle;
- a chair having a collapsible support for securing said chair to said second unit;
- a pivot having a pivot axis substantially parallel to said first and second axles for pivotably connecting said first unit to said second unit;
- a pivot assist unit comprising said tiller unit providing a lever arm for pivoting said first unit about said first wheel causing said second wheel to move toward said first wheel while said first and second wheels are located on the surface for folding of the first unit relative to said second unit of the foldable personal mobility vehicle about said pivot axis with said pivot axis of said pivot moving above said first and said second wheels, and
- a link interconnecting said pivot and said collapsible support for collapsing said chair support upon folding of the foldable personal mobility vehicle.

27. A foldable personal mobility vehicle as set forth in claim 26, wherein said electrical motor drive unit rotates said first axle for moving the foldable personal mobility vehicle.

28. A foldable personal mobility vehicle as set forth in claim 26, wherein said electrical motor drive unit rotates said second axle for moving the foldable personal mobility vehicle.

29. A foldable personal mobility vehicle for transporting an operator, comprising:
   a first unit having a first wheel being rotatable about a first axle;
   a tiller pivotably supporting said first wheel on said first unit for steering said foldable personal mobility vehicle;
   a second unit supporting plural second wheels being rotatable about a second axle;
   a brake for retarding said first wheel;
   an electrical motor drive unit for rotating said plural second wheels for moving the foldable personal mobility vehicle;
   a collapsible chair mounted relative to said second unit for seating the operator;
   a pivot having a pivot axis substantially parallel to said first and second axles for pivotably connecting said first unit to said second unit;
   a pivot assist unit comprising said electrical motor drive unit rotating said plural second wheels concomitantly with said brake retarding said first wheel for folding the personal mobility vehicle about said pivot axis; and
   a coupling interconnecting said pivot and said collapsible chair for collapsing said chair upon folding of the foldable personal mobility vehicle.

30. A foldable personal mobility vehicle for transporting an operator, comprising:
   a first unit having a first wheel being rotatable about a first axle;
   a tiller connected to said first wheel on said first unit for steering said foldable personal mobility vehicle;
   a second unit supporting plural second wheels being rotatable about a second axle;
   a pivot having a pivot axis substantially parallel to said first and second axles for pivotably connecting said first unit to said second unit;
   a pivot assist unit including a lever for pivoting said first unit relative to said second unit for folding the personal mobility vehicle about said pivot axis with said pivot axis of said pivot being located above said first axle and said second axle;
   an electrical motor drive unit for moving the foldable personal mobility vehicle; and
   a tiller pivot for pivoting said tiller relative to said first unit for enabling said tiller to be pivoted into general alignment with said first unit and second units of said foldable personal mobility vehicle when said foldable personal mobility vehicle is in a folded position; and
   said electrical motor drive unit and said tiller moving the foldable personal mobility vehicle when said foldable personal mobility vehicle is in said folded position.

31. The method of folding a personal mobility vehicle, the personal mobility vehicle comprising a first unit having a first wheel and a second unit having a second wheel with a pivot connecting the first unit to the second unit, the method comprising the steps of:
   braking the first wheel; and
   driving the second wheel for moving the second wheel towards the first wheel to pivot the first unit relative to the second unit for folding the personal mobility vehicle about the pivot.

32. The method of folding a personal mobility vehicle, the personal mobility vehicle comprising a first unit having a first wheel and a second unit having a second wheel with a pivot connecting the first unit to the second unit, the method comprising the steps of:
   initially pivoting the first unit relative to the second unit with a lever for folding the personal mobility vehicle about the pivot axis;
   braking the first wheel;
   driving the second wheel for moving the second wheel towards the first wheel to continue to pivot the first unit relative to the second unit for folding the personal mobility vehicle about the pivot.

33. The method of folding a personal mobility vehicle, the personal mobility vehicle comprising a first unit having a first wheel rotatable about a first axle and a second unit having a second wheel rotatable about a second axle with a pivot having a pivot axis substantially parallel to the first and second axles for pivotably connecting the first unit to the second unit, the method comprising the steps of:
   initially pivoting the first unit relative to the second unit with a lever for folding the personal mobility vehicle about the pivot axis;
   braking the first wheel; and
   driving the second wheel for moving the second wheel towards the first wheel to continue to pivot the first unit relative to the second unit for folding the personal mobility vehicle about the pivot axis until the pivot axis of the pivot is located above the first axle and the second axle.

* * * * *